US012562185B2

(12) United States Patent
Fan et al.

(10) Patent No.: US 12,562,185 B2
(45) Date of Patent: Feb. 24, 2026

(54) VOICE ACTIVITY DETECTION USING ACTIVE ACOUSTIC SENSING

(71) Applicant: Google LLC, Mountain View, CA (US)

(72) Inventors: Xiaoran Fan, Irvine, CA (US); Trausti Thormundsson, Irvine, CA (US)

(73) Assignee: Google LLC, Mountain View, CA (US)

( * ) Notice: Subject to any disclaimer, the term of this patent is extended or adjusted under 35 U.S.C. 154(b) by 168 days.

(21) Appl. No.: 18/400,397

(22) Filed: Dec. 29, 2023

(65) Prior Publication Data

US 2024/0312478 A1 Sep. 19, 2024

Related U.S. Application Data

(60) Provisional application No. 63/490,657, filed on Mar. 16, 2023.

(51) Int. Cl.
| | |
|---|---|
| *G10L 25/78* | (2013.01) |
| *H04B 1/00* | (2006.01) |
| *H04B 11/00* | (2006.01) |

(52) U.S. Cl.
CPC ............ *G10L 25/78* (2013.01); *H04B 1/0003* (2013.01); *H04B 11/00* (2013.01)

(58) Field of Classification Search
USPC ............................................. 704/1–504, 200
See application file for complete search history.

(56) References Cited

U.S. PATENT DOCUMENTS

| | | | | |
|---|---|---|---|---|
| 10,448,177 B2 * | 10/2019 | Nielsen | ............... | H04R 25/604 |
| 11,334,157 B1 * | 5/2022 | Gong | ....................... | G06F 3/017 |
| 2004/0196992 A1 * | 10/2004 | Ryan | ...................... | H04R 5/033 |
| | | | | 381/317 |
| 2007/0133442 A1 * | 6/2007 | Masuda | ................... | H04B 3/20 |
| | | | | 370/286 |

(Continued)

FOREIGN PATENT DOCUMENTS

| | | |
|---|---|---|
| WO | 2019226739 A1 | 11/2019 |
| WO | 2020082387 A1 | 4/2020 |

(Continued)

OTHER PUBLICATIONS

"International Search Report and Written Opinion", Application No. PCT/US2024/020238, Oct. 2, 2024, 21 pages.

(Continued)

*Primary Examiner* — Marcus T Riley
(74) *Attorney, Agent, or Firm* — Colby Nipper PLLC

(57) ABSTRACT

Techniques and apparatuses are described that perform voice activity detection using active acoustic sensing. By transmitting and receiving acoustic signals, a hearable can recognize changes in an acoustic circuit to perform voice activity detection. With active acoustic sensing, the hearable can detect a vocalization made by a user in a noisy and/or loud environment. As such, the hearable can support a voice user interface (VUI) by providing an indication of when the user is speaking. The hearable can also support multi-factor voice authentication to enhance security and provide robust protection from voice attacks. In addition to being relatively (Continued)

unobtrusive, some hearables can be configured to support voice activity detection using active acoustic sensing without the need for additional hardware.

20 Claims, 19 Drawing Sheets

(56) References Cited

U.S. PATENT DOCUMENTS

| | | | | |
|---|---|---|---|---|
| 2007/0276658 A1* | 11/2007 | Douglass | | G10L 21/0364 |
| | | | | 704/205 |
| 2010/0189269 A1* | 7/2010 | Haartsen | | H04R 29/00 |
| | | | | 381/375 |
| 2013/0282386 A1* | 10/2013 | Vilermo | | G10L 19/008 |
| | | | | 704/500 |
| 2014/0051940 A1* | 2/2014 | Messerschmidt | | A61B 5/6815 |
| | | | | 600/509 |
| 2017/0006393 A1* | 1/2017 | Nielsen | | H04R 25/305 |
| 2019/0278556 A1* | 9/2019 | Usher | | G10L 15/08 |
| 2019/0294769 A1* | 9/2019 | Lesso | | H04M 1/72454 |
| 2020/0186910 A1* | 6/2020 | Kemmerer | | H04R 29/001 |
| 2020/0344544 A1* | 10/2020 | Hunt | | H04R 17/02 |
| 2022/0087570 A1* | 3/2022 | Lesso | | A61B 5/7275 |
| 2022/0386959 A1* | 12/2022 | Georgiou | | A61B 5/0004 |
| 2024/0312478 A1* | 9/2024 | Fan | | H04R 1/1016 |
| 2025/0173415 A1* | 5/2025 | Maizels | | H04R 1/028 |
| 2025/0213142 A1* | 7/2025 | Amihood | | A61B 8/12 |
| 2025/0278240 A1* | 9/2025 | Amihood | | G01S 15/88 |

FOREIGN PATENT DOCUMENTS

| | | | | |
|---|---|---|---|---|
| WO | 2021123720 | | 6/2021 | |
| WO | 2022019442 A1 | | 1/2022 | |
| WO | 2023141608 | | 7/2023 | |
| WO | 2023240224 | | 12/2023 | |
| WO | 2024192250 | | 9/2024 | |
| WO | 2024192386 | | 9/2024 | |
| WO | WO-2024191490 A1 * | 9/2024 | | G06F 3/017 |
| WO | 2025144418 | | 7/2025 | |
| WO | WO-2025144418 A1 * | 7/2025 | | H04R 1/1083 |
| WO | WO-2025144419 A1 * | 7/2025 | | A61B 5/721 |

OTHER PUBLICATIONS

Al-Hammuri, et al., "Tongue Contour Tracking and Segmentation in Lingual Ultrasound for Speech Recognition: A Review", Nov. 15, 2022, 26 pages.

Chamary, Jv, "You'll Be Surprised How Often You Actually Touch Your Face", https://www.forbes.com/sites/jvchamary/2020/07/30/coronavirus-face-touching/?sh=442158ae375f, Jul. 30, 2020, 6 pages.

Rahman, et al., "How Frequently Do We Touch Facial T-Zone: A Systematic Review", https://www.annalsofglobalhealth.org/articles/10.5334/aogh.2956/, Jul. 6, 2020, 9 pages.

"International Search Report and Written Opinion", Application No. PCT/US2023/086379, Apr. 10, 2024, 13 pages.

Jin, et al., "EarCommand "Hearing" Your Silent Speech Commands In Ear", Jul. 7, 2022, 28 pages.

Nguyen, et al., "A Scalable and Domain Adaptive Respiratory Symptoms Detection Framework using Earables", Dec. 2021, 6 pages.

Zhang, et al., "Coughtrigger: Earbuds IMU Based Cough Detection Activator using an Energy-efficient Sensitivity-prioritized Time Series Classifier", May 2022, 5 pages.

Zhang, et al., "EarCough: Enabling Continuous Subject Cough Event Detection on Hearables", Mar. 18, 2023, 6 pages.

"International Search Report and Written Opinion", Application No. PCT/US2023/086468, Jun. 27, 2024, 11 pages.

"International Search Report and Written Opinion", Application No. PCT/US2024/019953, Jul. 4, 2024, 13 pages.

"Invitation to Pay Additional Fees and Partial Search Report", Application No. PCT/US2024/020238, Jul. 11, 2024, 11 pages.

Roddiger, et al., "Sensing with Earables", Sep. 7, 2022, 57 pages.

"International Preliminary Report and Patentability", Application No. PCT/US2023/086379, Sep. 10, 2025, 10 pages.

"International Preliminary Report on Patentability", Application No. PCT/US2024/020238, Sep. 10, 2025, 16 pages.

"International Preliminary Report on Patentability", Application No. PCT/US2024/019953, Sep. 10, 2025, 9 pages.

* cited by examiner

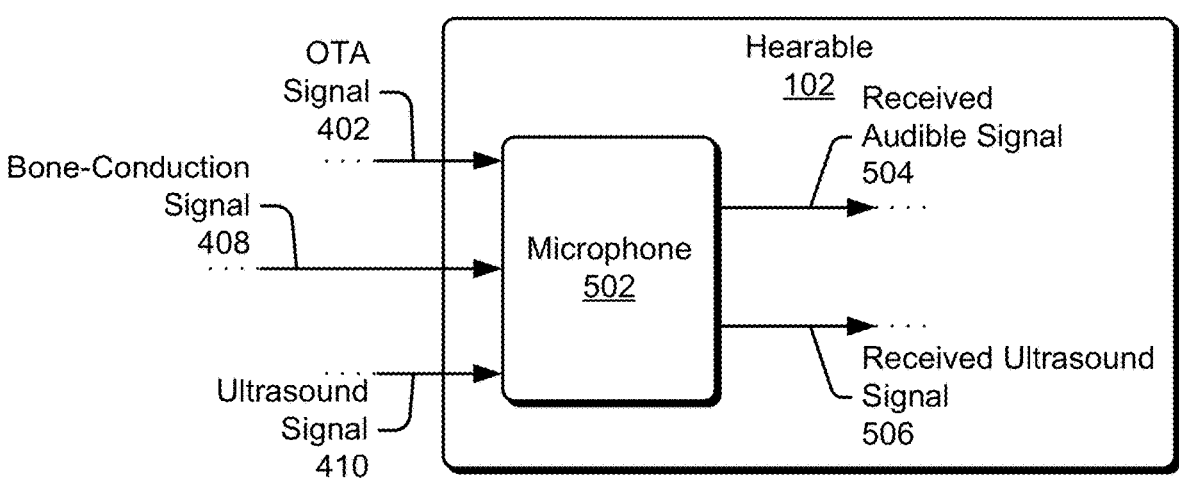
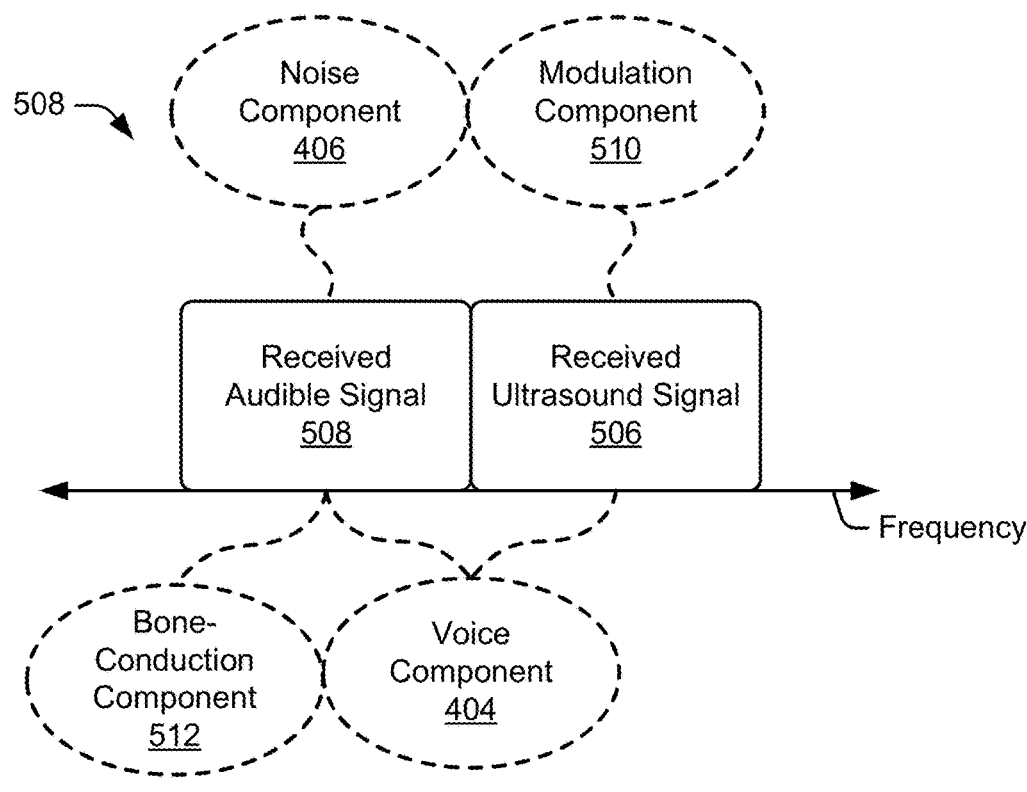
*FIG. 5*

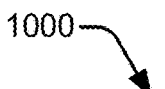
1000

Perform a calibration procedure
1002

Transmit and receive a first ultrasound signal that
propagates within at least a portion of an ear canal of
a user, the first ultrasound signal having multiple tones
1004

Select a subset of the multiple tones based on one or
more modified characteristics of the first ultrasound signal
1006

Perform measurement procedure
1008

Transmit and receive a second ultrasound signal that
propagates within at least the portion of the ear canal of the user
1010

Perform voice activity detection
using the second ultrasound signal
1012

*FIG. 10*

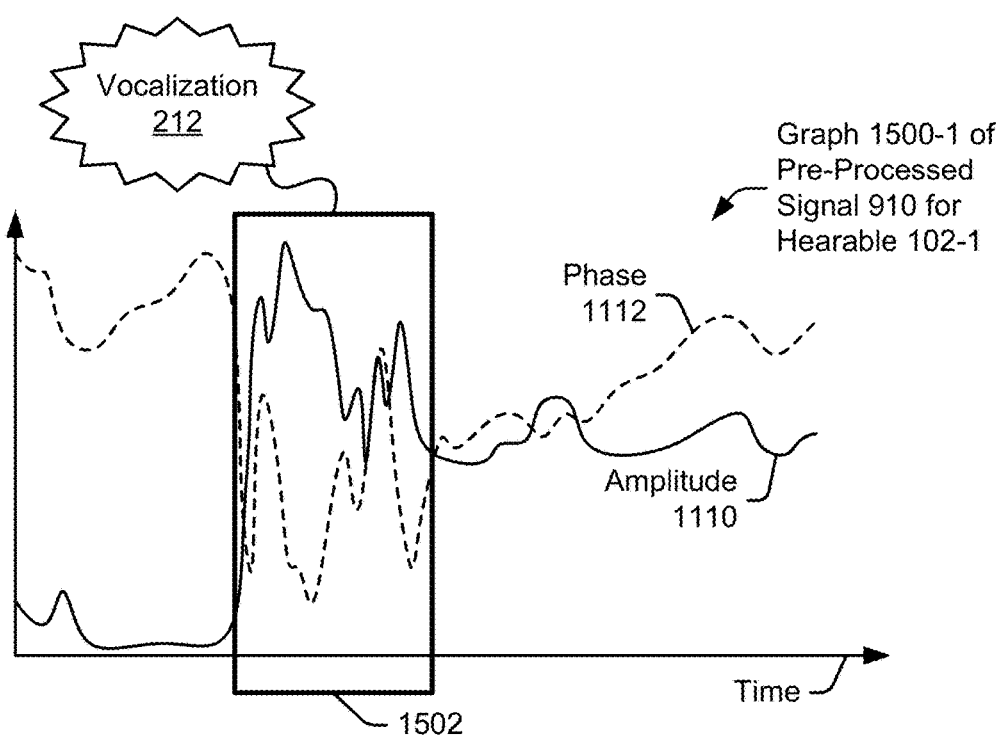
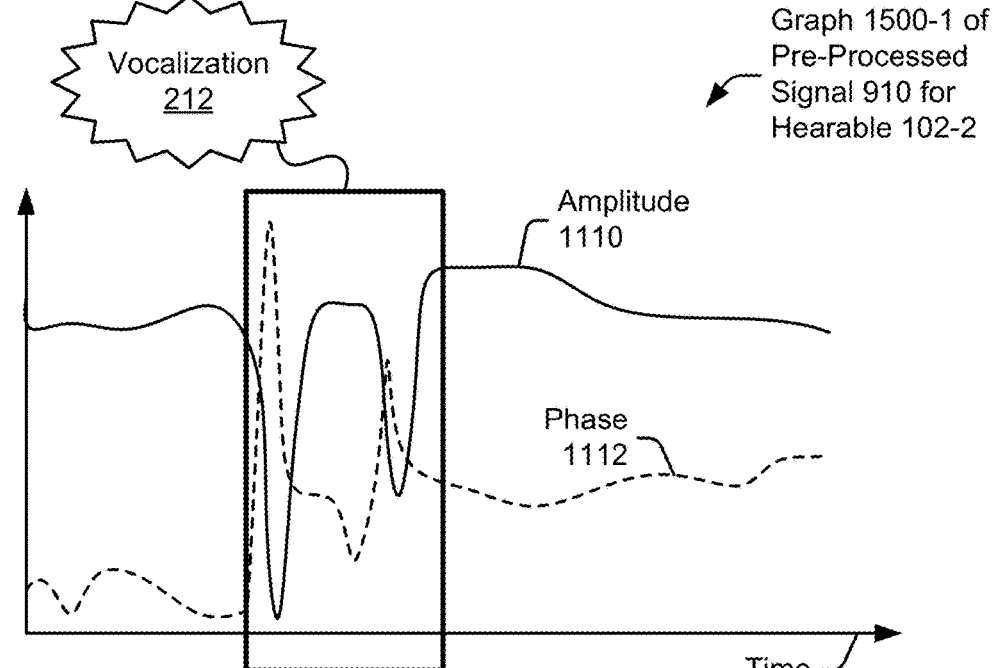
*FIG. 15*

1600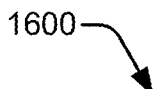

Transmit, during a first time period, an ultrasound transmit signal that propagates within at least a portion of an ear canal of a user
1602

Receive, during the first time period, an ultrasound receive signal, the ultrasound receive signal representing a version of the ultrasound transmit signal with one or more characteristics modified based on the propagation within the ear canal and based on a vocalization made by the user during the first time period
1604

Detect the vocalization based on the one or more modified characteristics of the ultrasound receive signal
1606

*FIG. 16*

1700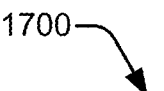

```
┌─────────────────────────────────────────────────┐
│   Perform active acoustic sensing to detect a    │
│   pressure wave that propagates within an ear    │
│   canal of a user and is associated with a       │
│   vocalization of the user                       │
│                      1702                         │
└─────────────────────────────────────────────────┘
                          │
                          ▼
┌─────────────────────────────────────────────────┐
│      Perform voice activity detection based      │
│          on the active acoustic sensing          │
│                      1704                         │
└─────────────────────────────────────────────────┘
                          │
                          ▼
┌─────────────────────────────────────────────────┐
│ Generate a signal that controls an operation of  │
│ at least one of a hearable or a computing device │
│ that is coupled to the hearable                  │
│                      1706                         │
└─────────────────────────────────────────────────┘
```

*FIG. 17*

VOICE ACTIVITY DETECTION USING ACTIVE ACOUSTIC SENSING

CROSS-REFERENCE TO RELATED APPLICATION

This application claims the benefit of U.S. Provisional Application No. 63/490,657 filed 16 Mar. 2023, the disclosure of which is hereby incorporated by reference in its entirety herein.

BACKGROUND

Wireless technology has become prevalent in everyday life, making communication and data readily accessible to users. One type of wireless technology are wireless hearables, examples of which include wireless earbuds and wireless headphones. Wireless hearables have allowed users freedom of movement while listening to audio content from music, audio books, podcasts, and videos. With the prevalence of wireless hearables, there is a market for adding additional features to existing hearables without introducing hardware changes.

SUMMARY

Techniques and apparatuses are described for performing voice activity detection using active acoustic sensing. By transmitting and receiving acoustic signals, a hearable can recognize changes in an acoustic circuit to perform voice activity detection. Voice activity detection involves detecting vocalizations made by a user. With active acoustic sensing, the hearable can detect a vocalization in a noisy and/or loud environment. As such, the hearable can support a voice user interface (VUI) by providing an indication of when the user is speaking. The hearable can also support multi-factor voice authentication to enhance security and provide robust protection from voice attacks. In addition to being relatively unobtrusive, some hearables can be configured to support voice activity detection using active acoustic sensing without the need for additional hardware. As such, the size, cost, and power usage of the hearable can help make voice activity detection accessible to a larger group of people and improve the user experience with hearables.

Aspects described below include a method for performing voice activity detection using active acoustic sensing. The method includes transmitting, during a first time period, an ultrasound transmit signal that propagates within at least a portion of an ear canal of a user. The method also includes receiving, during the first time period, an ultrasound receive signal. The ultrasound receive signal represents a version of the ultrasound transmit signal with one or more characteristics modified based on the propagation within the ear canal and based on a vocalization made by the user during the first time period. The method additionally includes detecting the vocalization based on the one or more modified characteristics of the ultrasound receive signal.

Aspects described below include a computer-readable storage medium comprising instructions that, responsive to execution by a processor, cause a hearable to perform any one of the methods described herein.

Aspects described below include a device with at least one transducer and at least one processor. The device is configured to perform, using the at least one transducer and the at least one processor, any one of the methods described herein.

Aspects described below include a system with means for performing voice activity detection using active acoustic sensing.

BRIEF DESCRIPTION OF DRAWINGS

Apparatuses for and techniques that perform voice activity detection using active acoustic sensing are described with reference to the following drawings. The same numbers are used throughout the drawings to reference like features and components:

FIG. 1-2 illustrates an example geometric change in an ear canal, which can be detected using active acoustic sensing;

FIG. 2 illustrates an example environment in which voice activity detection using active acoustic sensing can be implemented;

FIG. 5 illustrates an example operation of a microphone of a hearable;

FIG. 10 illustrates an example flow diagram for operating a hearable;

FIG. 15 illustrates an impact of vocalization on an ultrasound receive signal;

FIG. 16 illustrates an example method for performing voice activity detection using active acoustic sensing;

FIG. 17 illustrates another example method for performing voice activity detection using active acoustic sensing.

DETAILED DESCRIPTION

Figure 1:
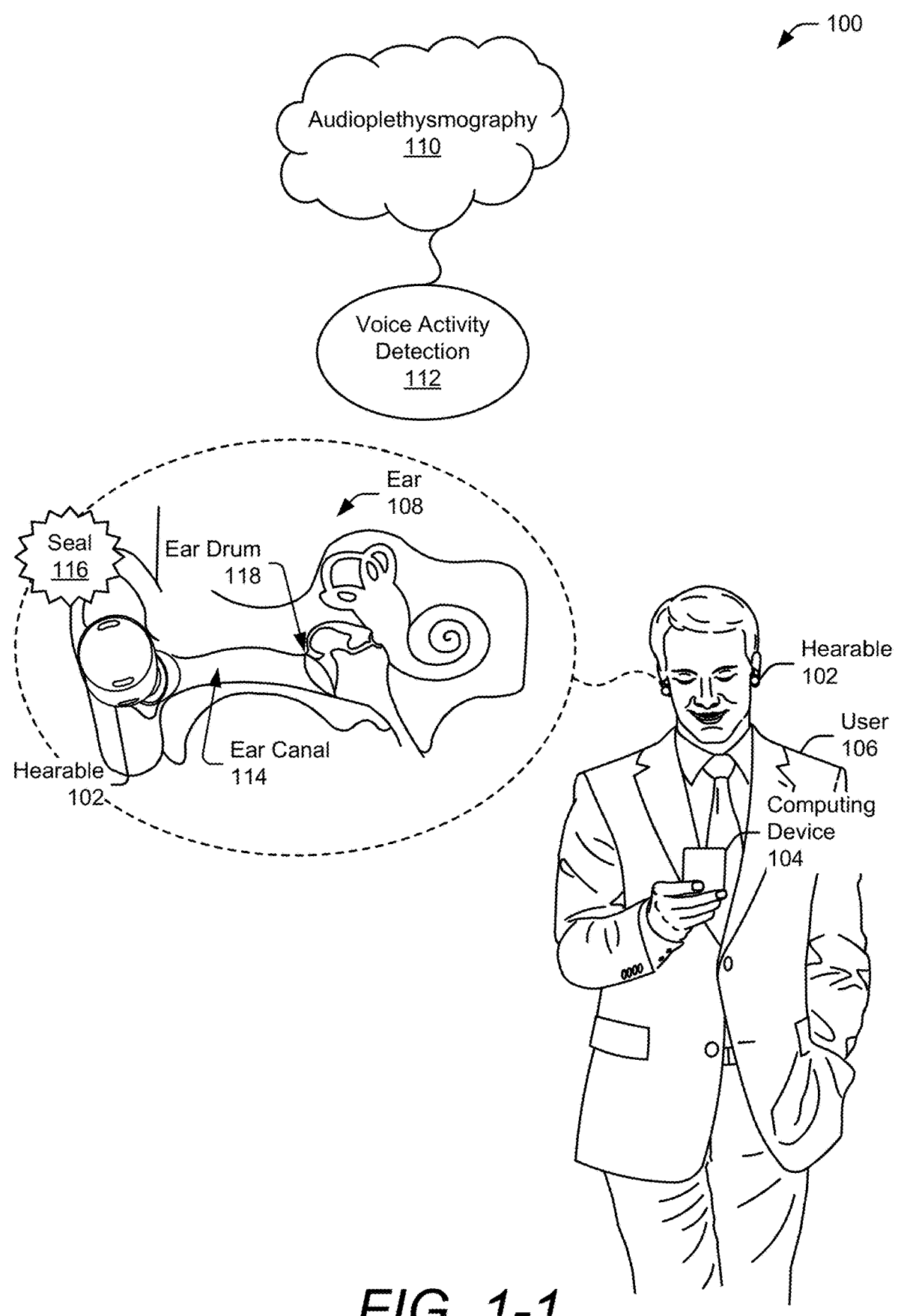
FIG. 1-1 illustrates an example environment in which active acoustic sensing can be implemented.
Figure 1:
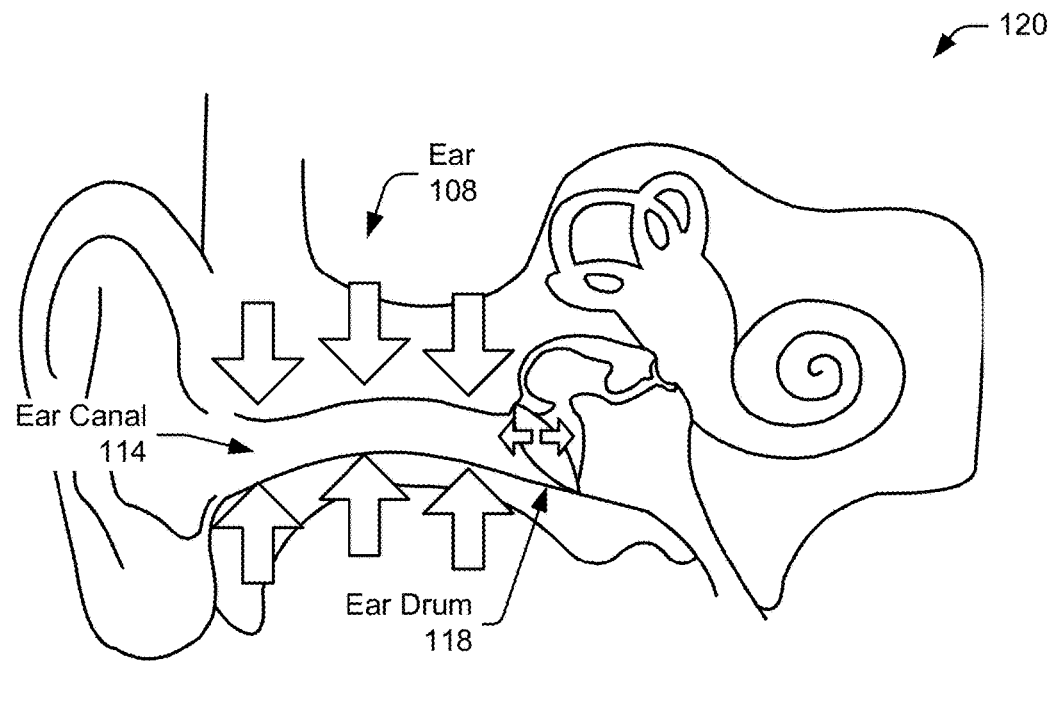

As electronic devices become more ubiquitous, users incorporate them into everyday life. A user, for example, may use an electronic device to get daily weather and traffic information, control a temperature of a home, answer a doorbell, turn on or off a light, and/or play background music. Interacting with some electronic devices, however, can be cumbersome and inefficient. An electronic device, for instance, can have a physical user interface that may require a user to navigate through one or more prompts by physically touching the electronic device. In this case, the user has to devote attention away from other primary tasks to interact with the electronic device, which can be inconvenient and disruptive.

To address this problem, some electronic devices support voice control, which enables a user to interact with the electronic device in a non-physical and less cognitively demanding way compared to other interfaces that require physical touch and/or the user's visual attention. With voice control, the electronic device seamlessly exists in the surrounding environment and provides the user access to information and services while the user performs a primary task, such as cooking, cleaning, driving, talking with people, or reading a book.

While voice control can provide a convenient means of interacting with an electronic device, there are several challenges associated with voice control. In a noisy environment, for instance, the user's voice can be made imperceptible by the other external noise. Consequently, it can be challenging for voice control to detect and/or recognize voice commands spoken by the user. Also, sometimes the noisy environment can cause the voice control to incorrectly respond to a voice of another person who is not authorized to use the electronic device.

Some devices address these challenges by integrating a voice accelerometer (VA) into earbuds. The voice accelerometer can detect a user speaking based on sound that travels by means of bone conduction. The voice accelerometer, however, can be bulky and expensive. To improve aesthetics and reduce encumbrance, it can be desirable to design hearables with smaller sizes. As space becomes limited, it can be challenging to integrate additional components, such as the voice accelerometer, within the hearables. With the prevalence of hearables, there is a market for adding additional features to existing hearables without introducing hardware changes.

Provided according to one or more preferred embodiments is a hearable, such as an earbud, that is capable of performing a novel physiological monitoring process termed herein audioplethysmography. Audioplethysmography is an active acoustic method capable of sensing subtle physiologically-related changes observable at a user's outer and middle ear. Instead of relying on other auxiliary sensors, such as optical or electrical sensors, audioplethysmography involves transmitting and receiving acoustic signals that at least partially propagate within a user's ear canal. To perform audioplethysmography, the hearable forms at least a partial seal in or around the user's outer ear. This seal enables formation of an acoustic circuit, which includes the seal, the hearable, the ear canal, and an ear drum of the ear. By transmitting and receiving acoustic signals, the hearable can recognize changes in the acoustic circuit to perform voice activity detection. Voice activity detection involves detecting vocalizations of the user. Vocalizations can include any sound that is produced using the user's lung's, vocal cords, and/or mouth. Example types of vocalizations can involve the user speaking, whispering, shouting, humming, whistling, singing, or making other utterances.

With active acoustic sensing, the hearable can detect a vocalization made by the user in a noisy and/or loud environment. As such, the hearable can support a voice user interface (VUI) by providing an indication of when the user is speaking. The hearable can also support multi-factor voice authentication to enhance security and provide robust protection from voice attacks. In addition to being relatively unobtrusive, some hearables can be configured to support voice activity detection using active acoustic sensing without the need for additional hardware. As such, the size, cost, and power usage of the hearable can help make voice activity detection accessible to a larger group of people and improve the user experience with hearables.

Active acoustic sensing can improve the performance of voice activity detection relative to other sensing techniques. Techniques that involve an electronic device observing the user's jaw movement using ultrasound, for instance, may not be as sensitive or as accurate compared to active acoustic sensing. This is in part because the hearable is worn by the user and active acoustic sensing can directly measure the user's vocalization based on a pressure wave that propagates to the user's ear. In contrast, observing the user's jaw movement with ultrasound may only work in limited circumstances in which the user is properly oriented relative to the electronic device and the electronic device has an unobstructed line-of-sight to the user's face to observe the jaw movement.

Operating Environment

FIG. 1-1 is an illustration of an example environment 100 in which active acoustic sensing can be implemented. In the example environment 100, a hearable 102 is connected to a computing device 104 using a physical or wireless interface. The hearable 102 is a device that can play audible content provided by the computing device 104 and direct the audible content into a user 106's ear 108. In this example, the hearable 102 operates together with the computing device 104. In other examples, the hearable 102 can operate or be implemented as a stand-alone device. Although depicted as a smartphone, the computing device 104 can include other types of devices, including those described with respect to FIG. 6.

The hearable 102 is capable of performing audioplethysmography 110, which is an active acoustic method of sensing that occurs at the ear 108. The hearable 102 can perform this sensing without the use of other auxiliary sensors, such as an optical sensor or an electrical sensor. Through audioplethysmography 110, the hearable 102 can perform voice activity detection 112.

Voice activity detection 112 enables the hearable 102 to detect vocalizations made by the user 106. To perform voice activity detection 112, the hearable 102 uses audioplethysmography 110 to detect subtle pressure waves that propagate to the user 106's ear canal 114. These pressure waves modify characteristics of ultrasound signals that are transmitted and received by the hearable 102 and propagate through the ear canal 114. With voice activity detection 112, the hearable 102 can enhance performance of a voice user interface or provide multi-factor authentication.

To use audioplethysmography 110, the user 106 positions the hearable 102 in a manner that creates at least a partial seal 116 around or in the ear 108. Some parts of the ear 108 are shown in FIG. 1-1, including the ear canal 114 and an ear drum 118 (or tympanic membrane). Due to the seal 116, the hearable 102, the ear canal 114, and the ear drum 118 couple together to form an acoustic circuit. Audioplethysmography 110 involves, at least in part, measuring properties associated with this acoustic circuit. The properties of the acoustic circuit can change due to a variety of different situations or actions.

Figure 2:
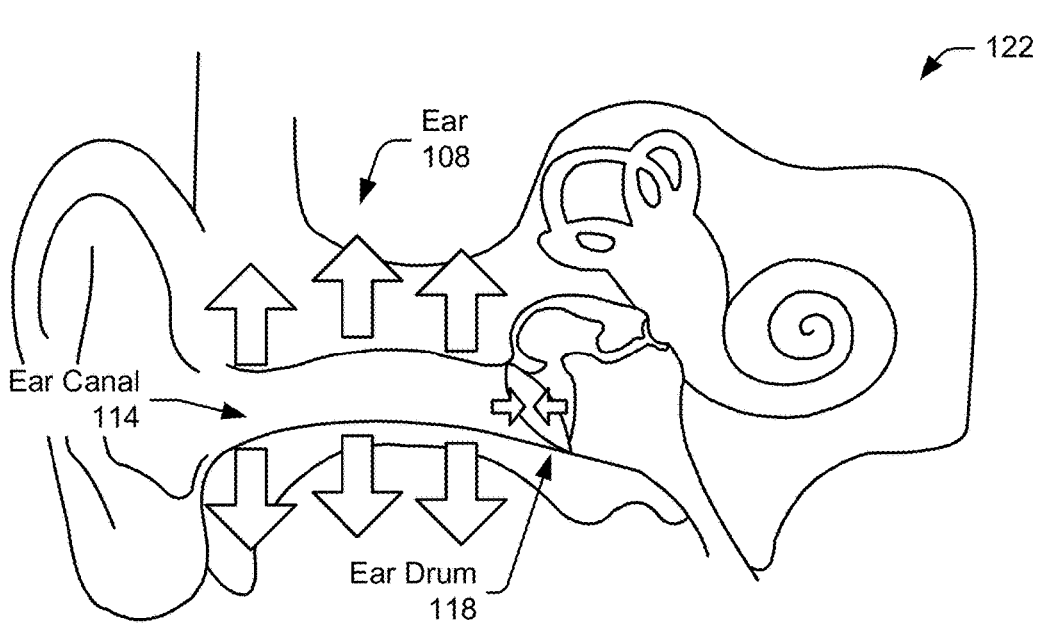
Figure 2:
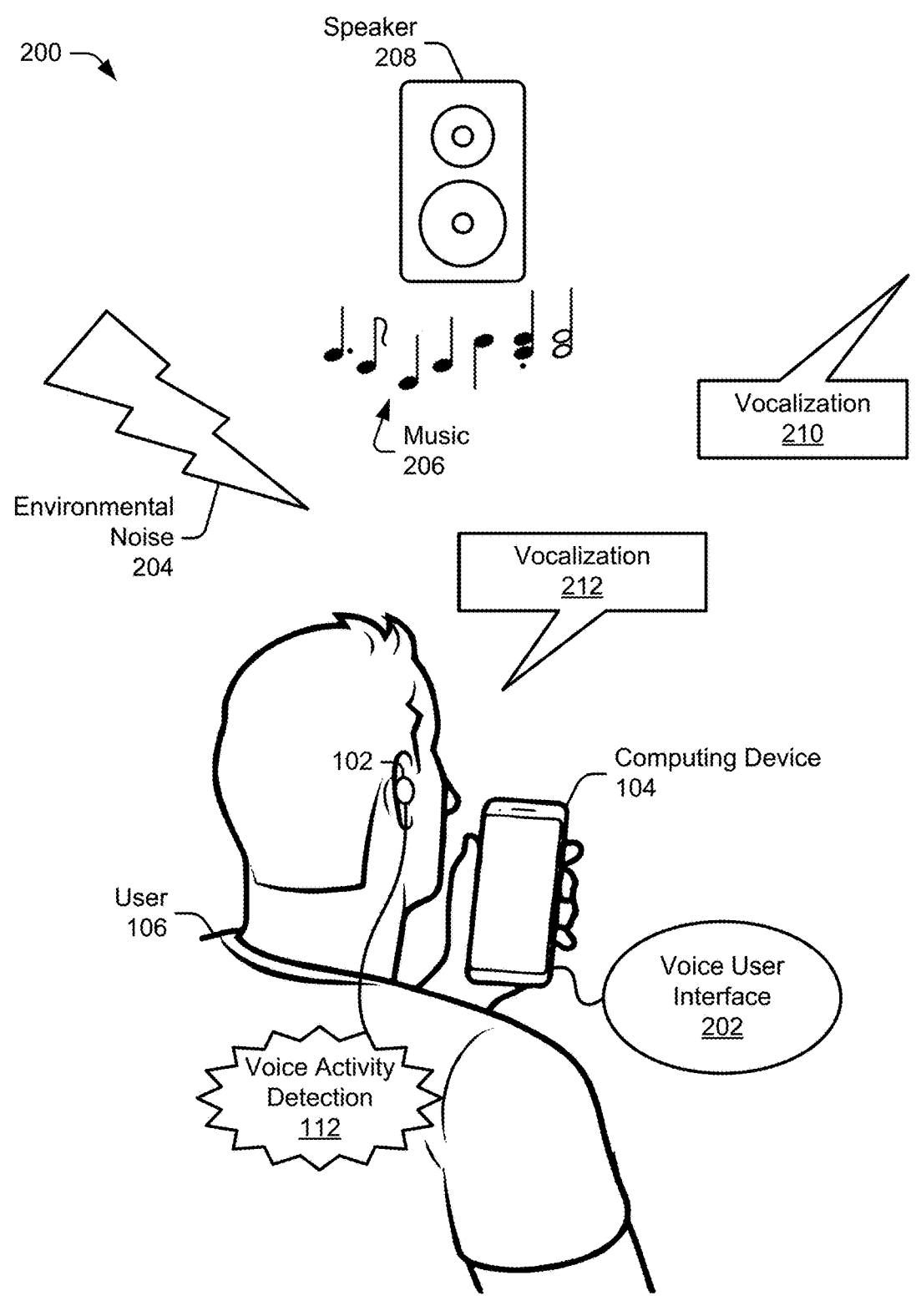

For example, consider FIG. 1-2 in which a change occurs in a physical structure of the ear 108. Example changes to the physical structure include a change in a geometric shape of the ear canal 114 and/or a change in a volume of the ear canal 114. This change can be caused, at least in part, by bone conduction and/or a pressure wave associated with a vocalization made by the user 106.

At 120, for instance, the tissue around the ear canal 114 and the ear drum 118 itself are slightly "squeezed" due to the bone conduction and/or the pressure wave. This squeeze causes a volume of the ear canal 114 to be slightly reduced at 120. At 122, however, the squeezing subsides and the volume of the ear canal 114 is slightly increased relative to 120. The physical changes within the ear 108 can modulate an amplitude and/or phase of an ultrasound signal that propagates through the ear canal 114, as further described with respect to FIG. 15.

The techniques for audioplethysmography 110 can be performed while the hearable 102 is playing audible content to the user 106 and/or while the user 106 is actively moving or performing an activity. As such, active acoustic sensing enables the hearable 102 to perform voice activity detection 112 in a variety of different situations. One such situation is further described with respect to FIG. 2.

FIG. 2 illustrates an example environment 200 in which voice activity detection 112 using active acoustic sensing can be implemented. The environment 200 represents a noisy and/or loud environment that includes a variety of audible signals. These audible signals propagate over-the-air and can make it challenging for the user 106 to utilize a voice user interface 202 of the computing device 104. Example noise sources include environmental noise 204, music 206 played by a speaker 208, a vocalization 210 made by another person, or some combination thereof.

The noise sources can make it challenging for the voice user interface 202 to detect and/or recognize a vocalization 212 made by the user 106. In some cases, the vocalization 212 can be a voiceprint phrase or a voice command. The voiceprint phrase can be a unique phrase that enables the user 106 to be identified and authenticated for voice-control access, as further described with respect to FIG. 3.

To address this problem, the user 106 makes the vocalization 212 while wearing the hearable 102. With voice activity detection 112, the hearable 102 can detect the vocalization 212 and indicate this to the voice user interface 202 of the computing device 104. This indication can assist the voice user interface 202 in detecting and/or recognizing the vocalization 212 in the noisy environment 200. The voice activity detection 112 can also be used to enhance security of the computing device 104, as further described with respect to FIG. 3.

Figure 3:
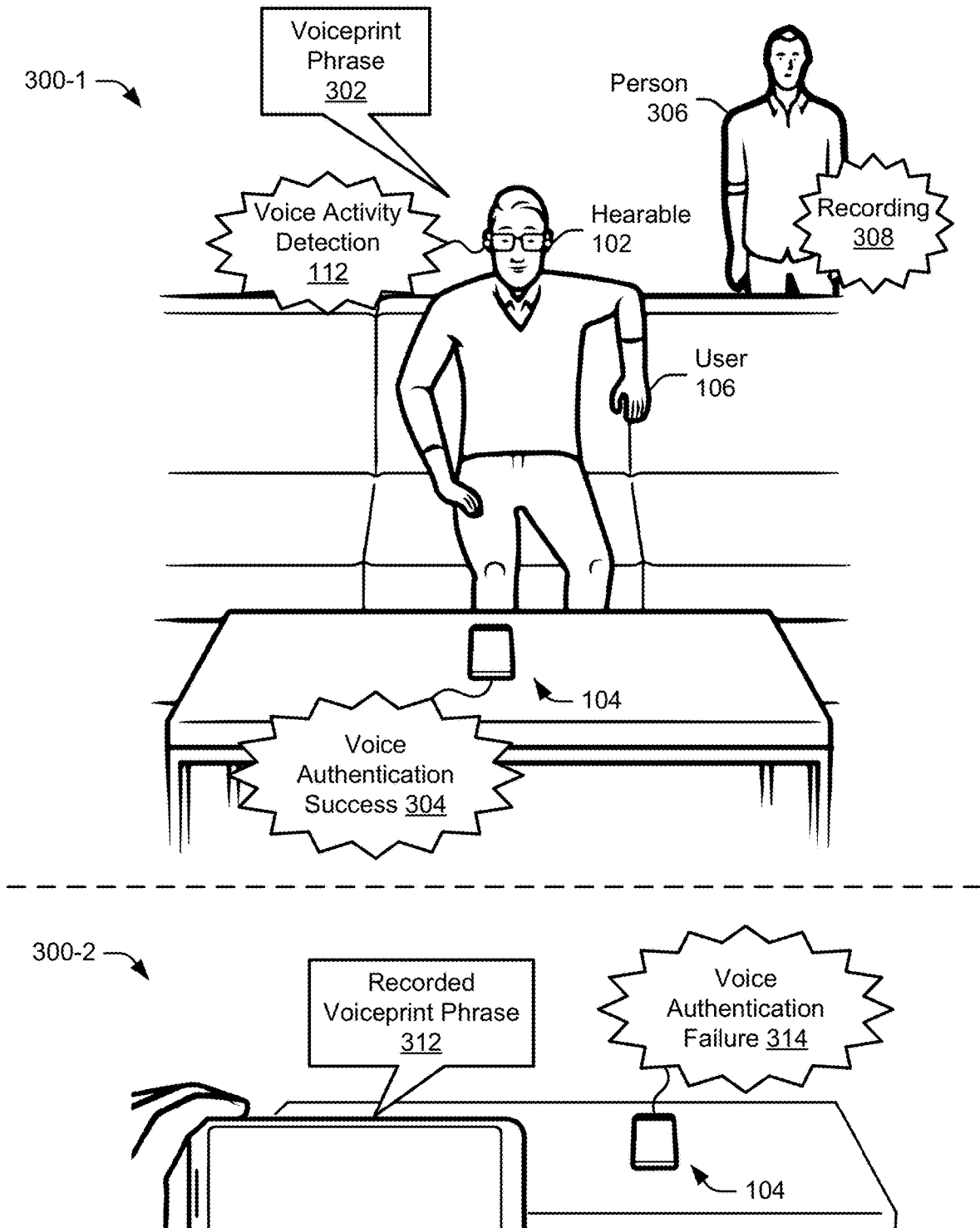
FIG. 3 illustrates other example environments in which voice activity detection using active acoustic sensing can be implemented.

FIG. 3 illustrates other example environments in which voice activity detection 112 using active acoustic sensing can be implemented. In environment 300-1, the user 106 speaks a voiceprint phrase 302 while wearing at least one hearable 102. In some implementations, the voiceprint phrase 302 can enable the user 106 to activate certain features of the computing device 104, such as providing hands-free control of the computing device 104 through spoken commands. During a same time interval that the computing device 104 detects the voiceprint phrase 302, the hearable 102 performs voice activity detection 112 using audioplethysmography 110 and determines that the user 106 is speaking.

The computing device 104 applies a multi-factor authentication (MFA) approach to voice authentication that requires the computing device 104 to recognize the voiceprint phrase 302 and the hearable 102 to detect voice activity during a same time interval that the voiceprint phrase 302 is received by the computing device 104. In environment 300-1, the computing device 104 determines that the voice authentication is successful, as shown at 304, based on the recognized voiceprint phrase 302 and the voice detected by the hearable 102.

Unbeknownst to the user 106, another person 306 in the environment 300-1 is recording 308 the user 106's voiceprint phrase 302 with a recording device 310. This person 306 is not an authorized user of the computing device 104. Without the techniques for performing multi-factor voice authentication using the active acoustic sensing of the hearable 102, the computing device 104's security can be vulnerable to hacking with this recorded voiceprint phrase 312.

In environment 300-2, for instance, the person 306 is proximate to or in possession of the computing device 104. In this situation, the user 106 may have accidentally walked away from the computing device 104 or the person 306 may have stolen the computing device 104 from the user 106. The person 306, however, does not have control over the hearable 102.

To access the computing device 104, the person 306 plays the recorded voiceprint phrase 312 through speakers of the recording device 310. In this case, the hearable 102 does not detect the user 106 speaking. Consequently, the computing device 104 determines that voice authentication failed, as shown at 314. In this manner, the computing device 104 denies the person 306 access to the features of the computing device 104 (e.g., the computing device 104 does not authenticate the person 306).

In some situations, the voice authentication fails in the environment 300-2 because the hearable 102 is no longer in communication with the computing device 104 and is unable to provide data associated with voice activity detection 112. For example, the hearable 102 can be too far from the computing device 104 (e.g., outside a communication range) or powered down. In other situations, the voice authentication fails because the hearable 102 does not detect speech coming from the user 106 during the time interval that the computing device 104 receives the recorded voiceprint phrase 312. In this case, the hearable 102 can be in communication with the computing device 104. As shown in environment 300-2, multi-factor voice authentication can enhance security of the computing device 104 and provide robust protection from voice attacks. The techniques for utilizing active acoustic sensing for voice activity detection 112 are further described with respect to FIGS. 4 and 5.

Figure 4:
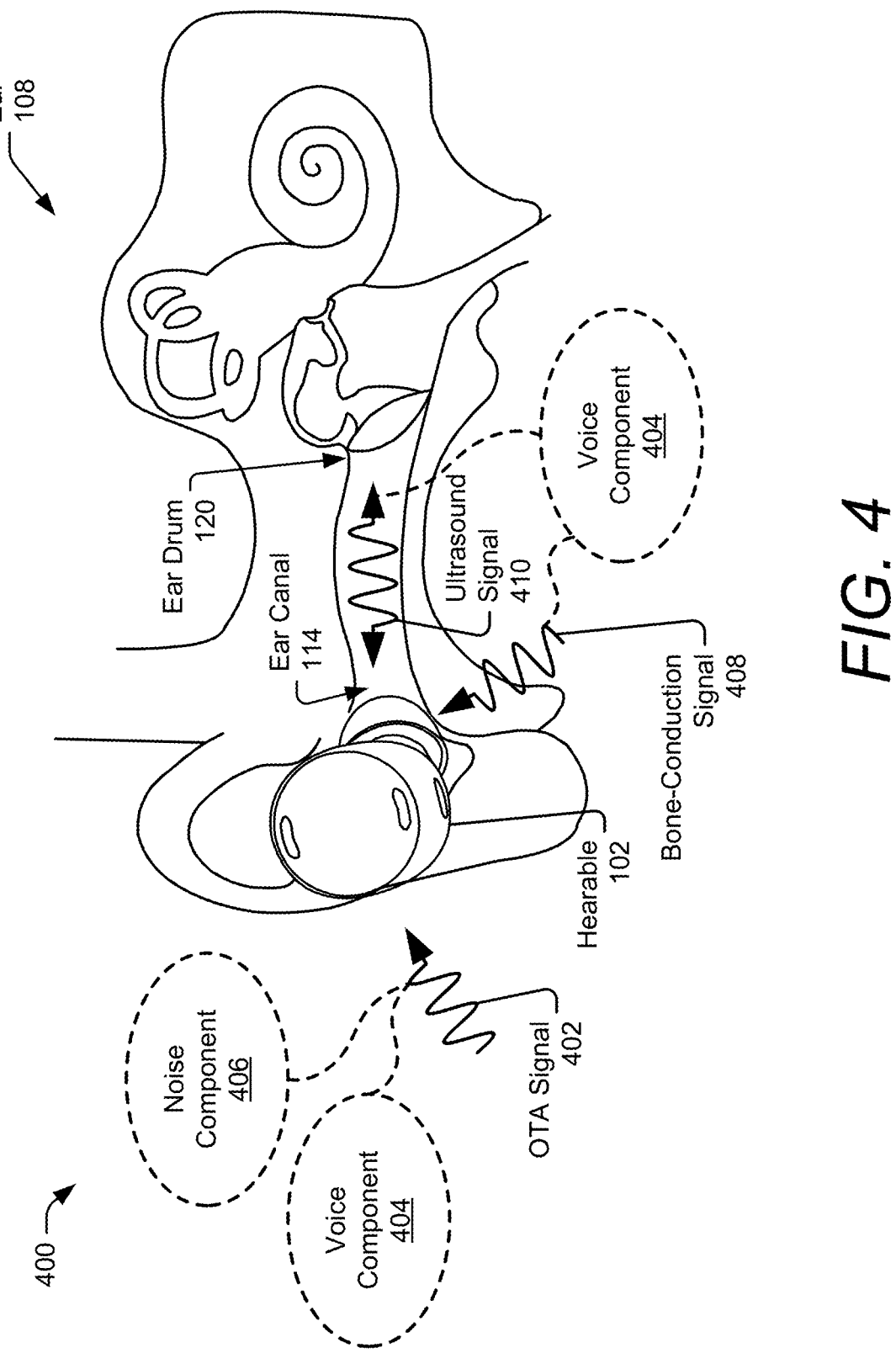
FIG. 4 illustrates example signals that can be detected using a hearable.

FIG. 4 illustrates example signals that can be detected by the hearable 102. In the environment 400, the hearable 102 is being worn by the user 106. During operation, the hearable 102 can receive a variety of different signals. In one aspect, the hearable 102 receives at least one over-the-air (OTA) signal 402 (OTA signal 402). The over-the-air signal 402 can include a voice component 404 and/or a noise component 406. The voice component 404 can include a vocalization 212 made by the user 106, such as the voiceprint phrase 302 of FIG. 3. The noise component 406 can represent any undesired audible sound that can mask or interfere with detection of the vocalization 212. The noise component 406 can represent the environmental noise 204, the music 206, and/or the vocalization 210 of FIG. 2. In general, the over-the-air signal 402 includes audible frequencies.

In another aspect, the hearable 102 receives at least one bone-conduction signal 408. The bone-conduction signal 408 represents sound that travels, via bone conduction, to the user 106's ear 108. The bone-conduction signal 408 also includes the voice component 404. In most circumstances, the bone-conduction signal 408 does not include the noise component 406.

To perform active acoustic sensing, the hearable 102 transmits and receives at least one ultrasound signal 410. The ultrasound signal 410 propagates within the ear canal 114. A vocalization 212 of the user 106 can cause a physical structure of the ear 108 to change. As such, the ultrasound signal 410 can also include the voice component 404.

The ultrasound signal 410 may not directly include the noise component 406. However, some designs of the hearable 102 can cause the noise component 406 associated with the over-the-air signal 402 to interfere with the detection of the voice component 404 within the ultrasound signal 410, as further explained below.

In some example implementations, the hearable 102 may be designed to minimize interference between the over-the-air signal 402 and the ultrasound signal 410. The hearable 102, for instance, can utilize different microphones to receive these signals. In this case, the hearable 102 can directly process the ultrasound signal 410 to detect the vocalization 212, as described with respect to FIG. 15. In other example implementations, the hearable 102 utilizes a same microphone to receive the over-the-air signal 402 and the ultrasound signal 410. While this may be beneficial for meeting size constraints of the hearable 102, it can cause a version of the noise component 406 to be present within the ultrasound signal 410. As the hearable 102 receives the over-the-air signal 402, the bone-conduction signal 408, and the ultrasound signal 410, these signals can interact with each other and make it challenging to utilize audioplethysmography 110 to detect the voice component 404, as further described with respect to FIG. 5.

FIG. 5 illustrates an example operation of a microphone 502 of the hearable 102. During an operation, the microphone 502 receives the over-the-air signal 402, the bone-conduction signal 408, and the ultrasound signal 410. The microphone 502 can include a filter module, which can generate separate signals associated with different frequency ranges. In this example, the microphone 502 generates a received audible signal 504 and a received ultrasound signal 506, which are further depicted in a graph 508 at the bottom of FIG. 5. These signals can be downconverted to baseband frequencies. In general, the received audible signal 504 and the received ultrasound signal 506 represent electrical signals that can be processed by other components of the hearable 102.

In the graph 508, the received audible signal 504 and the received ultrasound signal 506 are shown to include different frequencies. The received audible signal 504 can include frequencies associated with the audible frequency spectrum (e.g., frequencies between approximately 20 hertz (Hz) and 20 kilohertz (kHz)). In contrast, the received ultrasound signal 506 can include frequencies associated with the ultrasound frequency spectrum (e.g., frequencies between approximately 20 kHz and 2 megahertz (MHz)).

The received audible signal 504 represents a convolution of the over-the-air signal 402 and the bone-conduction signal 408. As such, the received audible signal 504 includes the voice component 404 associated with the vocalization 212 and the noise component 406. The voice component 404 is provided by both the over-the-air signal 402 and the bone-conduction signal 408. The received audible signal 504 can be represented by Equation 1:

$$Y_{RAS} = h_{BC} \cdot S + h_{OTA}(S + N) \qquad \text{Equation 1}$$

where $Y_{RAS}$ represents the received audible signal 504, $h_{BC}$ represents a bone-conduction channel, S represents the vocalization 212, $h_{OTA}$ represents an over-the-air channel, and N represents noise (e.g., the environmental noise 204, the music 206, and/or the vocalization 210). The $h_{BC} \cdot S$ term represents a bone-conduction component 512. The $h_{OTA} \cdot S$ term represents the voice component 404 of the received audible signal 504. The $h_{OTA} \cdot N$ term represents the noise component 406 of the received audible signal 504.

During reception, the received audible signal 504 can be modulated onto or mixed with the received ultrasound signal 506. This interference between the received audible signal 504 and the received ultrasound signal 506 can be due to non-linearities in the microphone 502, intermodulation distortion, harmonics, a mixing operation performed by the hearable 102, or some other component and/or operation of the hearable 102. The impact of the received audible signal 504 on the received ultrasound signal 506 is represented by a modulation component 510. The modulation component 510 represents portions of the received ultrasound signal 506 where an amplitude, phase, and/or frequency is affected due to the interference associated with the received audible signal 504. Generally speaking, the modulation component 510 represents a version of the received audible signal 504 that is shifted to the ultrasound frequencies. The modulation component 510 is linearly modulated into the ultrasound frequency spectrum. The received ultrasound signal 506 can be represented by Equation 2:

$$Y_{RUS} = h_{US} \cdot S + h_{MC} \cdot Y_{RAS} \qquad \text{Equation 2}$$

where $Y_{RUS}$ represents the received ultrasound signal 506, $h_{US}$ represents an ultrasound channel, S represents the vocalization 212, $h_{MC}$ represents a modulation channel, and $Y_{RAS}$ represents the received audible signal 504. The $h_{US} \cdot S$ term represents the voice component 404 of the received ultrasound signal 506. The $h_{MC} \cdot Y_{RAS}$ term represents the modulation component 510. Due to the modulation channel, the received ultrasound signal 506 includes a linearly modulated version of the received audible signal 504. As such, the noise component 406 within the modulated version of the received audible signal 504 can make it challenging to directly detect the voice component 404 within the received ultrasound signal 506.

Generally speaking, the voice component 404 is superimposed onto the ultrasound signal 410 and is correlated with the vocalization 212. The voice component 404 is not correlated with the noise component 406. The voice component 404 modulates the received ultrasound signal 506 in a different manner than the modulation component 510 due to the bone conduction and change in the physical structure within the ear 108.

The voice component 404 of the received ultrasound signal 506 is frequency dependent. In other words, different ultrasound frequencies modulate the vocalization 212 differently. The bone-conduction component 512, however, does not have frequency selectivity. In other words, the bone conduction component 510 is associated with a fixed channel. The techniques for voice activity detection 112 utilize the received audible signal 504 to extract the voice component 404 from the received ultrasound signal 506, as further described with respect to FIGS. 12 and 13.

Figure 6:
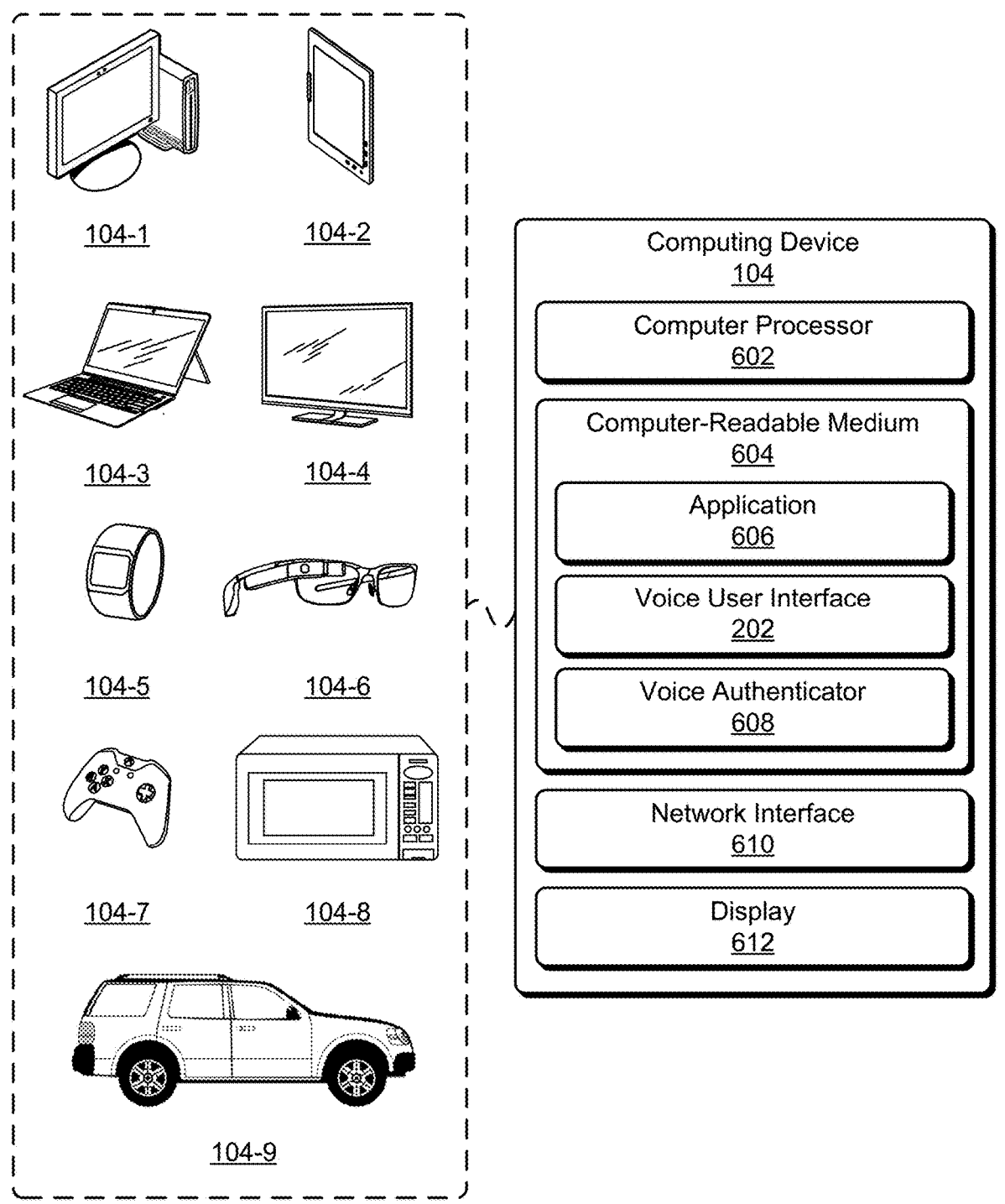
FIG. 6 illustrates example components of a computing device.

FIG. 6 illustrates an example implementation of the computing device 104. The computing device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as an augmented and/or virtual reality headset, a home service device, a smart speaker, a smart thermostat, a baby monitor, a Wi-Fi™ router, a drone, a trackpad, a drawing pad, a netbook, an e-reader, a home automation and control system, a wall display, and another home appliance. Note that the computing device 104 can be wearable, non-wearable but mobile, or relatively immobile (e.g., desktops and appliances).

The computing device 104 includes one or more computer processors 602 and at least one computer-readable medium 604, which includes memory media and storage media. Applications and/or an operating system (not shown) embodied as computer-readable instructions on the computer-readable medium 604 can be executed by the computer processor 602 to provide some of the functionalities described herein. The computer-readable medium 604 can optionally include an application 606, the voice user interface 202, and/or a voice authenticator 608. The application 606 can use information provided by the hearable 102 to perform an action. Example actions can include displaying data associated with audioplethysmography 110 to the user 106. For voice activity detection 112, the application 606 can indicate whether or not the vocalization 212 is detected. The voice user interface 202 can enable the user 106 to control the computing device 104 via voice commands, as described with respect to FIG. 2. The voice authenticator 608 can authenticate the user 106 and enable use of the voice user interface 202 upon successful authentication. The application 606, the voice user interface 202, and/or the voice authenticator 608 can utilize aspects of voice activity detection 112 to improve performance and/or enhance security of the computing device 104.

The computing device 104 can also include a network interface 610 for communicating data over wired, wireless, or optical networks. For example, the network interface 610 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, Bluetooth®, and the like. The computing device 104 may also include the display 612. Although not explicitly shown, the hearable 102 can be integrated within the computing device 104, or can connect physically or wirelessly to the computing device 104. The hearable 102 is further described with respect to FIG. 7.

Figure 7:
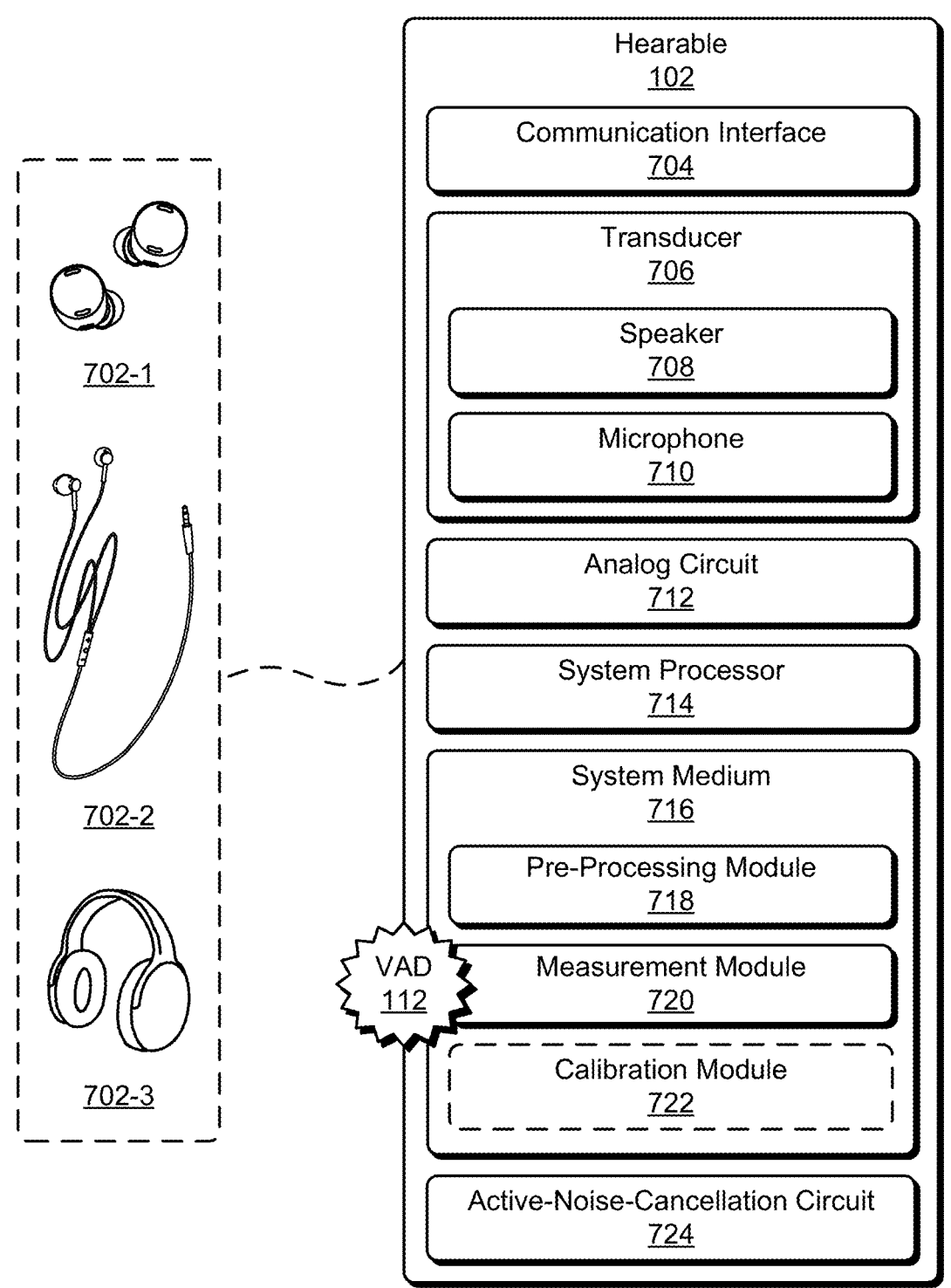
FIG. 7 illustrates example components of a hearable.

FIG. 7 illustrates an example hearable 102. The hearable 102 is illustrated with various non-limiting example devices, including wireless earbuds 702-1, wired earbuds 702-2, and headphones 702-3. The earbuds 702-1 and 702-2 are a type of in-ear device that fits into the ear canal 114. Each earbud 702-1 or 702-2 can represent a hearable 102. Headphones 702-3 can rest on top of or over the ears 108. The headphones 702-3 can represent closed-back headphones, open-back headphones, on-ear headphones, or over-ear headphones. Each headphone 702-2 includes two hearables 102, which are physically packaged together. In general, there is one hearable 102 for each ear 108.

The hearable 102 includes a communication interface 704 to communicate with the computing device 104, though this need not be used when the hearable 102 is integrated within the computing device 104. The communication interface 704 can be a wired interface or a wireless interface, in which audio content is passed from the computing device 104 to the hearable 102. The hearable 102 can also use the communication interface 704 to pass data associated with audioplethysmography 110 to the computing device 104. In general, the data provided by the communication interface 704 is in a format usable by the application 606, the voice user interface 202, and/or the voice authenticator 608.

The communication interface 704 also enables the hearable 102 to communicate with another hearable 102. During bistatic sensing, for instance, the hearable 102 can use the communication interface 704 to coordinate with the other hearable 102 to support two-ear audioplethysmography 110, as further described with respect to FIG. 8. In particular, the transmitting hearable 102 can communicate timing and waveform information to the receiving hearable 102 to enable the receiving hearable 102 to appropriately demodulate a received ultrasound signal 506.

The hearable 102 includes at least one transducer 706 that can convert electrical signals into sound waves. The transducer 706 can also detect and convert sound waves into electrical signals. These sound waves may include ultrasonic frequencies and/or audible frequencies, either of which may be used for audioplethysmography 110. In particular, a frequency spectrum (e.g., range of frequencies) that the transducer 706 uses to generate an acoustic signal can include frequencies from a low-end of the audible range to a high-end of the ultrasonic range, e.g., between 20 hertz (Hz) to 2 megahertz (MHz). Other example frequency spectrums for audioplethysmography 110 can encompass frequencies between 20 Hz and 20 kilohertz (kHz), between 20 kHz and 2 MHz, between 20 and 60 kHz, or between 30 and 40 kHz.

In an example implementation, the transducer 706 has a monostatic topology. With this topology, the transducer 706 can convert the electrical signals into sound waves and convert sound waves into electrical signals (e.g., can transmit or receive acoustic signals). Example monostatic transducers may include piezoelectric transducers, capacitive transducers, and micro-machined ultrasonic transducers (MUTs) that use microelectromechanical systems (MEMS) technology.

Alternatively, the transducer 706 can be implemented with a bistatic topology, which includes multiple transducers that are physically separate. In this case, a first transducer converts the electrical signal into sound waves (e.g., transmits acoustic signals), and a second transducer converts sound waves into an electrical signal (e.g., receives the acoustic signals). An example bistatic topology can be implemented using at least one speaker 708 and at least one microphone 710. The speaker 708 and the microphone 710 can be dedicated for audioplethysmography 110 or can be used for both audioplethysmography 110 and other functions of the computing device 104 (e.g., presenting audible content to the user 106, capturing the user 106's voice for a phone call, or for voice control). The microphone 710 can represent the microphone 502 of FIG. 5.

In general, the speaker 708 and the microphone 710 are directed towards the ear canal 114 (e.g., oriented towards the ear canal 114). Accordingly, the speaker 708 can direct ultrasound signals towards the ear canal 114, and the microphone 710 is responsive to receiving ultrasound signals from the direction associated with the ear canal 114. In some cases, the hearable 102 includes another microphone 710 that is directed away from the ear canal 114 towards an external environment (e.g., oriented away from the ear canal 114). This other microphone can be used to receive the over-the-air signal 402.

The hearable 102 includes at least one analog circuit 712, which includes circuitry and logic for conditioning electrical signals in an analog domain. The analog circuit 712 can include analog-to-digital converters, digital-to-analog converters, amplifiers, filters, mixers, and switches for generating and modifying electrical signals. In some implementations, the analog circuit 712 includes other hardware circuitry associated with the speaker 708 or microphone 710.

The hearable 102 also includes at least one system processor 714 and at least one system medium 716 (e.g., one or more computer-readable storage media). In the depicted configuration, the system medium 716 includes a pre-processing module 718 and a measurement module 720. The system medium 716 also optionally includes a calibration module 722. The pre-processing module 718, the measurement module 720, and the calibration module 722 can be implemented using hardware, software, firmware, or a combination thereof. In this example, the system processor 714 implements the pre-processing module 718, the measurement module 720, and the calibration module 722. In an alternative example, the computer processor 602 of the computing device 104 can implement at least a portion of the pre-processing module 718, the measurement module 720, and/or the calibration module 722. In this case, the hearable 102 can communicate digital samples of the acoustic signals to the computing device 104 using the communication interface 704.

Operations of the pre-processing module 718, the measurement module 720, and the calibration module 722 are further described with respect to FIGS. 9 to 13. Aspects of voice activity detection 112 using active acoustic sensing can be performed, at least partially, by the measurement module 720, as further described with respect to FIGS. 12 and 13.

Some hearables 102 include an active-noise-cancellation circuit 724, which enables the hearables 102 to reduce background or environmental noise. In this case, the microphone 710 used for audioplethysmography 110 can be implemented using a feedback microphone of the active-noise-cancellation circuit 724. During active noise cancellation, the feedback microphone provides feedback information regarding the performance of the active noise cancellation. During audioplethysmography 110, the feedback microphone receives an ultrasound signal, which is provided to the pre-processing module 718. In some situations, active noise cancellation and audioplethysmography 110 are performed simultaneously using the feedback microphone. In this case, the ultrasound signal received by the feedback microphone can be provided to the pre-processing module 718 and the feedback signal for active noise cancellation can be provided to the active-noise-cancellation circuit 724. Other implementations are also possible in which the microphone 710 is implemented using a feedforward microphone of the active-noise-cancellation circuit 724.

Although not explicitly shown in FIG. 7, the system medium 716 can also include a voice user interface 202 and/or a voice authenticator 608. In this case, the voice user interface 202 enables the user 106 to use voice controls to control an operation of the hearable 102. The voice authenticator 608 can authenticate the user 106 and enable the voice user interface 202 for the hearable 102. Different types of audioplethysmography 110 are further described with respect to FIG. 8.

Active Acoustic Sensing

Figure 8:
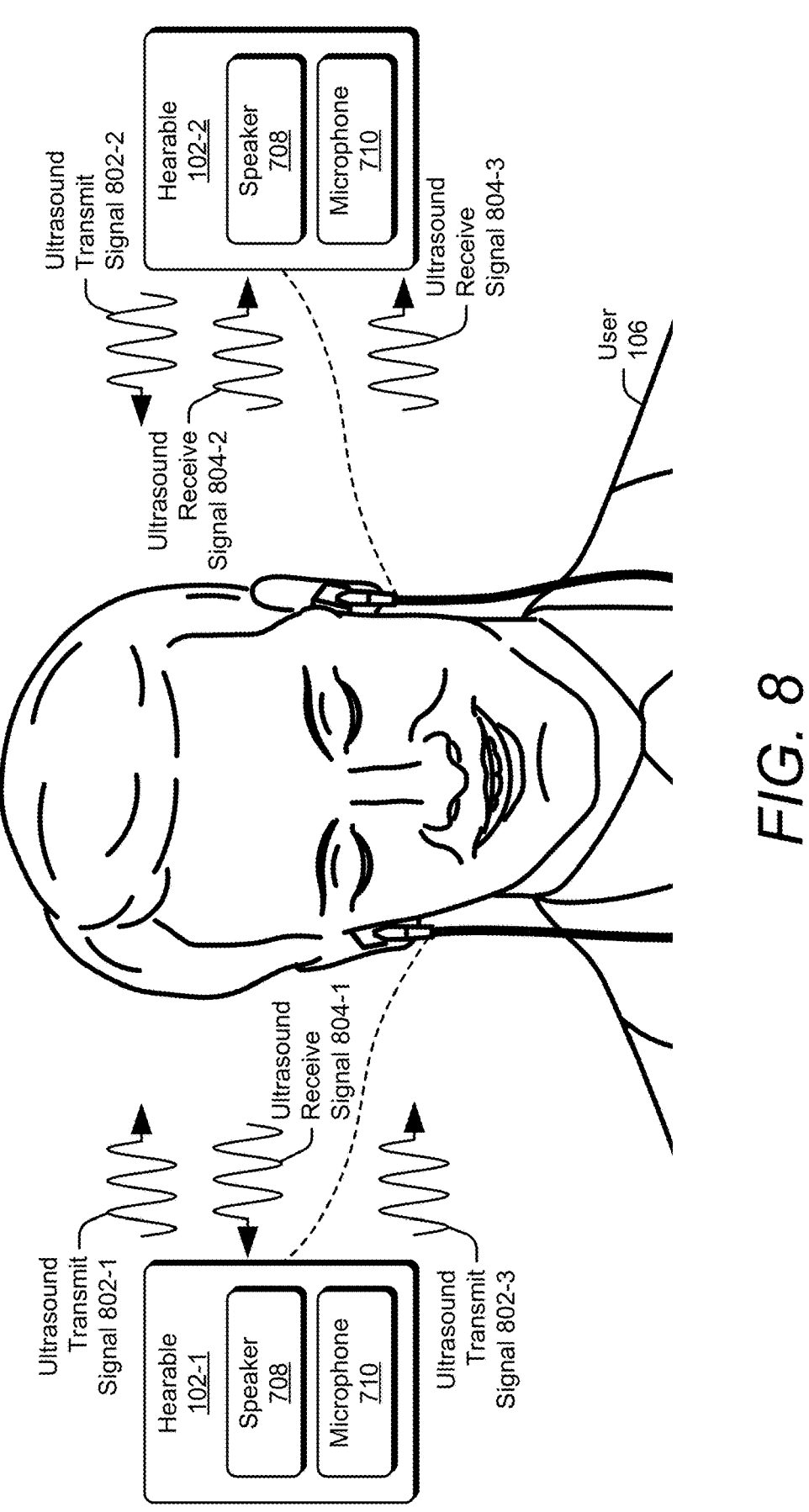
FIG. 8 illustrates example operations of two hearables.

FIG. 8 illustrates example operations of two hearables 102-1 and 102-2. In a first example operation, the hearables 102-1 and 102-2 perform single-ear audioplethysmography 110. This means that the hearables 102-1 and 102-2 independently perform audioplethysmography 110 on different ears 108 of the user 106. In this case, the first hearable 102-1 is proximate to the user 106's right ear 108, and the second hearable 102-2 is proximate to the user 106's left ear 108. Each hearable 102-1 and 102-2 includes a speaker 708 and a microphone 710. The hearables 102-1 and 102-2 can operate in a monostatic manner during the same time period or during different time periods. In other words, each hearable 102-1 and 102-2 can independently transmit and receive ultrasound signals.

For example, the first hearable 102-1 uses the speaker 708 to transmit a first ultrasound transmit 802-1, which propagates within at least a portion of the user 106's right ear canal 114. The first hearable 102-1 uses the microphone 710 to receive a first ultrasound receive signal 804-1. The first ultrasound receive signal 804-1 represents a version of the first ultrasound transmit signal 802-1 that is modified, at least in part, by the acoustic circuit associated with the right ear canal 114. This modification can change an amplitude, phase, and/or frequency of the first ultrasound receive signal 804-1 relative to the first ultrasound transmit signal 802-1.

Similarly, the second hearable 102-2 uses the speaker 708 to transmit a second ultrasound transmit signal 802-2, which propagates within at least a portion of the user 106's left ear canal 114. The second hearable 102-2 uses the microphone 710 to receive a second ultrasound receive signal 804-2. The second ultrasound receive signal 804-2 represents a version of the second ultrasound transmit signal 802-2 that is modified by the acoustic circuit associated with the left ear canal 114. This modification can change an amplitude, phase, and/or frequency of the second ultrasound receive signal 804-2 relative to the second ultrasound transmit signal 802-2.

The techniques of single-ear audioplethysmography 110 can be particularly beneficial as it enables the computing device 104 to compile information from both hearables 102-1 and 102-2, which can further improve measurement confidence. For some aspects of audioplethysmography 110, it can be beneficial to analyze the acoustic channel between two ears 108, as further described below.

In a second example operation, the two hearables 102-1 and 102-2 perform two-ear audioplethysmography 110. This means that the hearables 102-1 and 102-2 jointly perform audioplethysmography 110 across two ears 108 of the user 106. In this case, at least one of the hearables 102 (e.g., the first hearable 102-1) includes the speaker 708, and at least one of the other hearables 102 (e.g., the second hearable 102-2) includes the microphone 710. The hearables 102-1 and 102-2 operate together in a bistatic manner during the same time period.

During operation, the first hearable 102-1 transmits a third ultrasound transmit 802-3 using the speaker 708. The third ultrasound transmit signal 802-3 propagates through the user 106's right ear canal 114. The third ultrasound transmit signal 802-3 also propagates through an acoustic channel that exists between the right and left ears 108. In the left ear 108, the third ultrasound transmit signal 802-3 propagates through the user 106's left ear canal 114 and is represented as a third ultrasound receive signal 804-3. The second hearable 102-2 receives the third ultrasound receive signal 804-3 using the microphone 710. The third ultrasound receive signal 804-3 represents a version of the third ultrasound transmit signal 802-3 that is modified by the acoustic circuit associated with the right ear canal 114, modified by the acoustic channel associated with the user 106's face, and modified by the acoustic circuit associated with the left ear canal 114. This modification can change an amplitude, phase, and/or frequency of the third ultrasound receive signal 804-3 relative to the third ultrasound transmit signal 802-3. In some cases, the hearable 102-2 measures the time-of-flight (ToF) associated with the propagation from the first hearable 102-1 to the second hearable 102-2. Sometimes a combination of single-ear and two-ear audioplethysmography 110 are applied to further improve measurement confidence.

The ultrasound transmit signals 802 of FIG. 8 can represent a variety of different types of signals as described above with respect to FIG. 7. In example implementations, the ultrasound transmit signal 802 can be the ultrasound signal 410 of FIGS. 4 and 5. Also, the ultrasound transmit signal 802 can be a continuous-wave signal (e.g., a sinusoidal signal) or a pulsed signal. Some ultrasound transmit signals 802 can have a particular tone (or frequency). Other ultrasound transmit signals 802 can have multiple tones (or multiple frequencies). A variety of modulations can be applied to generate the ultrasound transmit signal 802. Example modulations include linear frequency modulations, triangular frequency modulations, stepped frequency modulations, phase modulations, or amplitude modulations. The ultrasound transmit signal 802 can be transmitted as part of a calibration procedure or a measurement procedure, as further described as part of FIG. 9.

Figure 9:
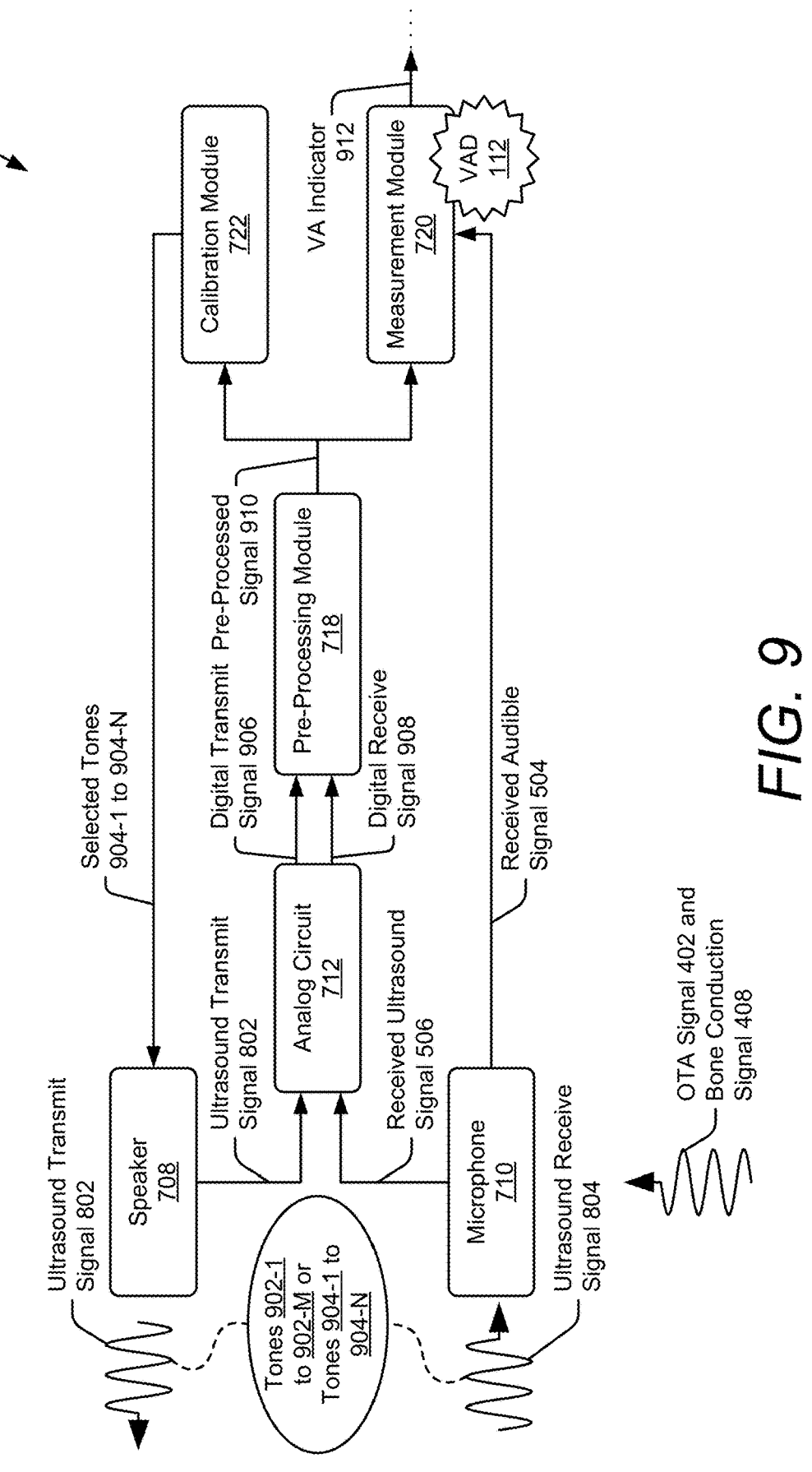
FIG. 9 illustrates an example implementation of a hearable capable of performing voice activity detection using active acoustic sensing.

FIG. 9 illustrates an example implementation of the hearable 102 for performing voice activity detection 112. In the depicted configuration, the hearable 102 includes the speaker 708, the microphone 710, the analog circuit 712, the pre-processing module 718, the measurement module 720, and the calibration module 722. Other implementations of the hearable 102, however, are also possible in which the hearable 102 does not include the calibration module 722 to reduce processing power requirements. In this case, the pre-processing module 718 can perform aspects of frequency selection as further described with respect to FIG. 12 to improve the signal-to-noise ratio for audioplethysmography 110.

Outputs of the speaker 708 and the microphone 710 are coupled to inputs of the analog circuit 712. The pre-processing module 718 has inputs that are coupled to outputs of the analog circuit 712. The pre-processing module 718 also has outputs that are coupled to inputs of the measurement module 720 and the calibration module 722. The measurement module 720 has another input that is coupled to the microphone 710. The calibration module 722 has an output that is coupled to the speaker 708.

Consider an example operation of the hearable 102 in accordance with single-ear audioplethysmography 110. In the case that the hearable 102 includes the calibration module 722, the hearable 102 can perform a calibration process prior to performing a measurement process. The calibration process and the measurement process are further described with respect to FIG. 10.

During both the calibration process and the measurement process, the speaker 708 transmits the ultrasound transmit signal 802 and the microphone 710 receives the ultrasound receive signal 804. During the calibration process, the ultrasound transmit signal 802 and the ultrasound receive signal 804 can have tones 902-1 to 902-M, where M represents a positive integer. During the measurement process, the ultrasound transmit signal 802 and the ultrasound receive signal 804 can have selected tones 904-1 to 904-N, where N represents a positive integer that is less than or equal to M. The selected tones 904-1 to 904-N can represent a subset (sometimes a proper subset) of the tones 902-1 to 902-M. The microphone 710 can also receive the over-the-air signal 402 and the bone conduction signal 408 during the measurement process.

The analog circuit 712 performs analog-to-digital conversion to generate a digital transmit signal 906 and a digital receive signal 908 based on the ultrasound transmit signal 802 and the received ultrasound signal 506, respectively. The pre-processing module 718 performs frequency down-conversion and demodulation to generate at least one pre-processed signal 910 based on the digital transmit signal 906 and the digital receive signal 908. The pre-processing module 718 can also apply filtering to generate the pre-processed signal 910.

As part of the calibration procedure, the calibration module 722 processes the pre-processed signal 910 to determine the selected tones 904-1 to 904-N. The selected tones 904-1 to 904-N can improve performance of audioplethysmography 110 during the measurement procedure. The calibration module 722 communicates the selected tones 904-1 to 904-N to the speaker 708 using a control signal. The speaker 708 accepts the control signal that identifies the selected tones 904-1 to 904-N and can transmit a subsequent ultrasound transmit signal 802 for the measurement procedure using the selected tones 904-1 to 904-N.

As part of the measurement procedure, the measurement module 720 can perform aspects of voice activity detection 112 using the pre-processed signal 910 to generate a voice activity indicator 912 (VA indicator 912). In cases in which the environment is noisy, the measurement module 720 can also utilize the received audible signal 504 provided by the microphone 710 to further process the pre-processed signal 910 for voice activity detection 112. The voice activity indicator 912 can be communicated to the application 606, the voice user interface 202, and/or the voice authenticator 608. Additionally or alternatively, the voice activity indicator 912 can include a control signal for controlling operation of the hearable 102 and/or the computing device 104. The calibration procedure and the measurement procedure are further described with respect to FIG. 10.

FIG. 10 illustrates an example flow diagram 1000 for operating a hearable 102. In FIG. 10, the hearable 102 can optionally perform a calibration procedure at 1002 using the calibration module 722. The calibration procedure can determine appropriate characteristics (e.g., waveform or signal characteristics) of ultrasound transmit signals 802 to improve audioplethysmography 110 (e.g., to enhance the performance of voice activity detection 112). The calibration procedure enables audioplethysmography 110 to take into account the wear of the hearable 102 (e.g., the position of the hearable 102 relative to the ear canal 114) and the physical structure of the ear canal 114 to determine a transmission frequency that can increase sensitivity. With the calibration procedure, the hearable 102 can dynamically adjust the transmission frequency (e.g., one or more carrier frequencies) each time the seal 116 is formed (e.g., based on the wear of the hearable 102) and based on the unique physical structure of the ear 108. Through this calibration procedure, the hearables 102 on different ears 108 may operate with one or more different ultrasound frequencies. Steps of the calibration procedure are further described below.

In some circumstances, the hearable 102 can perform on-head detection (or in-ear detection) by detecting the presence of the seal 116 and initiating the calibration procedure based on a determination that on-head detection is "true." In other circumstances, the hearable 102 can initiate the calibration procedure based on a specified schedule or a timer, which can be controlled by the user 106 via the computing device 104.

At 1004, the hearable 102 executes the calibration procedure by transmitting and receiving a first ultrasound signal. The first ultrasound signal propagates within at least a portion of the ear canal 114 of the user 106 and has multiple tones 902-1 to 902-M (or multiple carrier frequencies). The multiple tones 902-1 to 902-M are transmitted in parallel or in series over a given time interval. The first ultrasound transmit signal 802 can have a particular bandwidth on the order of several kilohertz. For example, the ultrasound transmit signal 802 can have a bandwidth of approximately 4, 5, 6, 8, 10, 16, or 20 kHz. In example implementations, the first ultrasound transmit signal 802 is transmitted over multiple seconds, such as 2, 3, 4, 6, or more seconds. A duration of each tone 902 can be evenly divided over a total duration of the first ultrasound transmit signal 802.

In an example implementation, the ultrasound transmit signal 902 has seven tones 902 (e.g., M equals 7). In some cases, the tones 902 are evenly distributed across an interval. For example, the tones 902 can be in 1 kHz increments between 32 kHz and 38 kHz (e.g., at approximately 32, 33, 34, 35, 36, 37, and 38 kHz). The term "approximately" means that the tones 902 can be within 5% of a given value or less (e.g., within 3%, 2%, or 1% of the given value).

An amplitude of the ultrasound transmit signal 802 can be approximately the same across the tones 902-1 to 902-M. In this manner, power is evenly distributed across each tone 902. The quantity of tones 902 (e.g., M) can be determined based on an output power of the speaker 708. Increasing the quantity of tones 902 can increase a likelihood that the hearable 102 can support voice activity detection 112 across various conditions including user wear and a physical structure of the user 106's ear canal 114. However, an amplitude of the ultrasound transmit signal 802 can be limited across these tones 902 based on the output power of the speaker 708. Thus, the quantity of tones 902 can be optimized based on an amount of output power that is available for audioplethysmography 110.

At 1006, the calibration procedure selects one or more tones 904-1 to 904-N to be used for a measurement procedure based on one or more modified characteristics of the ultrasound receive signal 804. The process for selecting the tones 904 is further described with respect to FIG. 11. In general, the calibration procedure determines that the selected tones 904 improve a signal-to-noise ratio for audioplethysmography 110 (or more specifically for voice activity detection 112).

At 1008, the hearable 102 performs a measurement procedure using the measurement module 720. In accordance with the measurement procedure, the hearable 102 transmits a second ultrasound transmit signal 802 that propagates within at least the portion of the ear canal 114 of the user 106. If the calibration procedure was performed, the second ultrasound transmit signal 802 can have the selected tones 904-1 to 904-M that were determined by the calibration procedure. The selected tones 904 can be transmitted in parallel or in series over a given time interval.

An amplitude of the second ultrasound transmit signal 802 can be approximately the same across the selected tones 904-1 to 904-N. In this manner, power is evenly distributed across each selected tone. The amplitude of the second ultrasound transmit signal 802 can be higher than the amplitude of the first ultrasound transmit signal 802 because the available output power is distributed across fewer tones.

Additionally or alternatively, a duration of each of the selected tones 904 of the second ultrasound transmit signal 802 can be longer than the duration of the tones 902 of the first ultrasound transmit signal 802. The higher amplitude and/or the longer duration can further improve the signal-to-noise ratio performance of the hearable 102 for audioplethysmography 110. By using a few selected tones 904 that were determined to improve signal-to-noise ratio performance, the measurement procedure can achieve a higher accuracy for voice activity detection 112.

At 1012, the hearable 102 performs voice activity detection 112 using the second ultrasound signal (e.g., the second ultrasound receive signal 804). An example process for performing voice activity detection 112 is further described with respect to FIG. 13. The calibration module 722 is further described with respect to FIG. 11.

Figure 11:
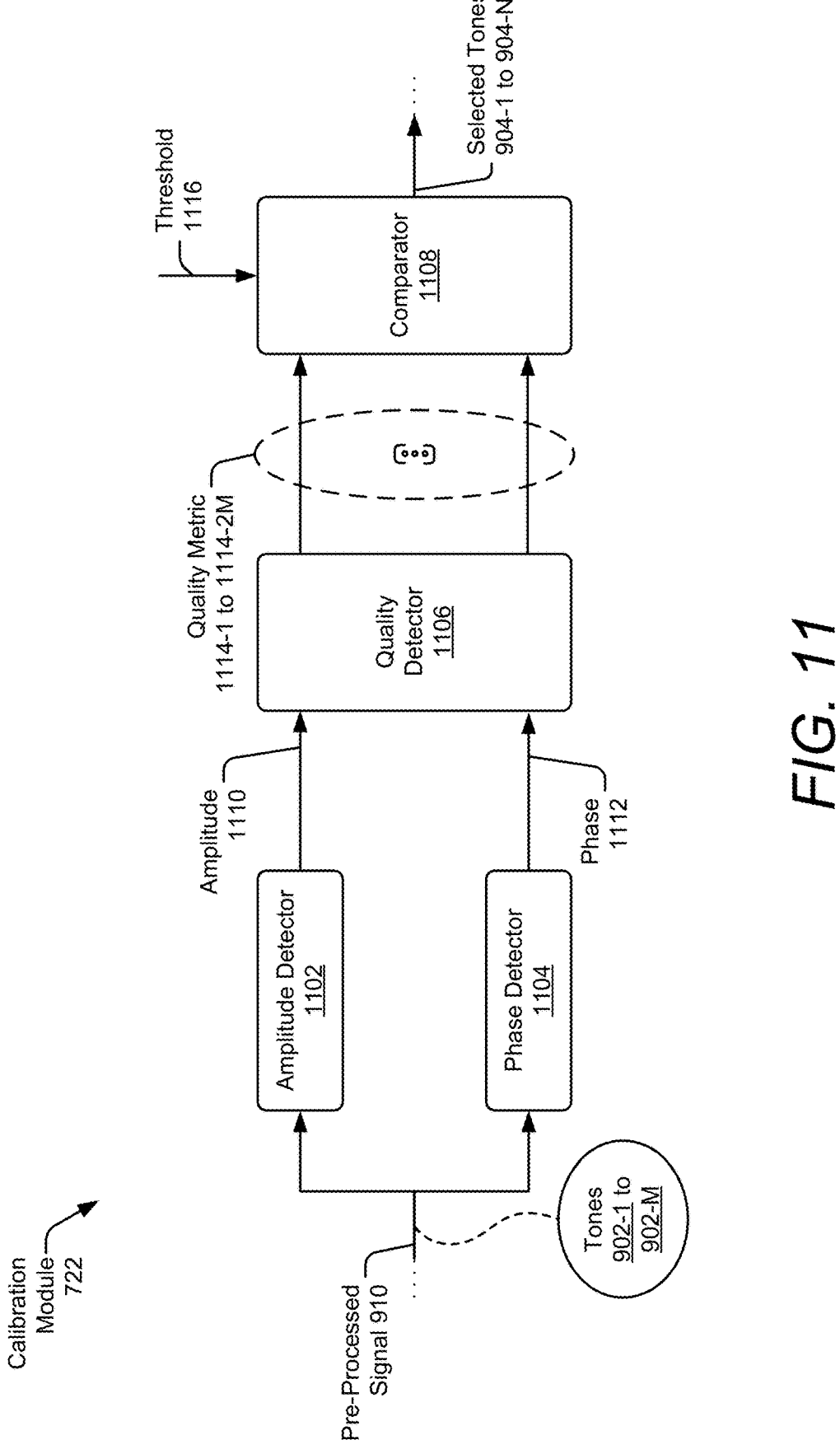
FIG. 11 illustrates an example scheme implemented by a calibration module of a hearable.

FIG. 11 illustrates an example scheme implemented by the calibration module 722. In the depicted configuration, the calibration module 722 implements a frequency selector, which selects one or more tones 904 for the measurement procedure. In the example implementation, the calibration module 722 includes at least one amplitude detector 1102, at least one phase detector 1104, at least one quality detector 1106, and at least one comparator 1108. The operations of these components are further described below.

During the calibration procedure, the calibration module 722 accepts the pre-processed signal 910 from the pre-processing module 718, as previously described with respect to FIG. 9. The pre-processed signal 910 can include amplitude and/or phase information associated with the multiple tones 902-1 to 902-M, which were used to transmit the first ultrasound signal described at 1002 in FIG. 10.

In this example, the calibration module 722 extracts an amplitude 1110 of the pre-processed signal 910 using the amplitude detector 1102 and extracts a phase 1112 of the pre-processed signal 910 using the phase detector 1104. Alternatively, if in-phase and quadrature components of the pre-processed signal 910 are received separately, the amplitude detector 1102 and the phase detector 1104 can respectively measure the amplitude 1110 and phase 1112 based on the in-phase and quadrature components.

The quality detector 1106 measures quality metrics 1114-1 to 1114-2M for each of the tones 902-1 to 902-M and for each of the characteristics (e.g., amplitude 1110 and phase 1112). In general, the quality metrics 1114 can represent a variety of different metrics, including peak-to-average ratios and/or signal-to-noise ratios. The peak-to-average ratio represents a peak intensity within a frequency range of interest divided by an average intensity within this frequency range. A higher quality metric 1114 indicates a higher-quality signal, or more generally, better performance for audioplethysmography 110.

In one aspect, the comparator 1108 can evaluate the quality metrics 1114-1 to 1114-2M with respect to a threshold 1116. The threshold 1116 can be set, for example, to a particular value. In other cases, the calibration module 722 can dynamically determine the threshold 1116 and update it over time based on the observed quality metrics 1114-1 of 1114-2M. In an example implementation, the comparator 1108 determines the selected tones 904-1 to 904-N for a subsequent measurement procedure based on the frequencies associated with the quality metrics 1114-1 to 1114-M that are greater than or equal to the threshold 1116.

Additionally or alternatively, the comparator 1108 can evaluate the quality metrics 1114-1 to 1114-2M with respect to each other. In an example implementation, the comparator 1108 determines one of the selected tones 904 based on a frequency with the highest quality metric 1114 across the amplitude 1110. Also, the comparator 1108 can determine one of the selected tones 904 based on a frequency with the highest quality metric 1114 across the phase 1112. In other implementations, the comparator 1108 can determine a single selected tone 904 based on a frequency having the highest quality metric 1114 associated with either the amplitude 1110 or the phase 1112.

In general, the calibration module 722 enables the selected tones 904-1 to 904-N to be dynamically adjusted prior to the measurement procedure based on a current environment, which can account for a wear of the hearable 102 (e.g., a current insertion depth and/or rotation), a physical structure of the user 106's ear canal 114, and a response characteristic of the hearable 102 (e.g., speaker, microphone, and/or housing). In this manner, the calibration module 722 can improve the signal-to-noise ratio performance of the hearable 102 for the measurement procedure. The calibration module 722 can also determine which tones 904 generate ultrasound receive signals 804 with desired characteristics for voice activity detection 112. In general, the calibration procedure can be performed whether or not the user 106 is speaking.

In FIGS. 9 to 11, the calibration procedure and the measurement procedure are described as individual procedures that occur at different time intervals. In particular, the calibration procedure occurs before the measurement procedure. This enables the ultrasound transmit signal 802 for the measurement procedure to be transmitted with fewer tones than the ultrasound transmit signal 802 used for the calibration procedure, which can increase signal-to-noise ratio performance for audioplethysmography 110. In some implementations, however, the hearable 102 can have sufficient output power to perform the measurement procedure with the multiple tones 902-1 to 902-M using a single ultrasound transmit signal 802. In this case, aspects of the calibration module can be integrated within the pre-processing module 718 as a frequency selector, which is further described with respect to FIG. 12. This frequency selector can effectively pass the selected tones 904-1 to 904-N for further processing. Aspects of the measurement procedure are further described with respect to FIG. 12.

Voice Activity Detection

Figure 12:
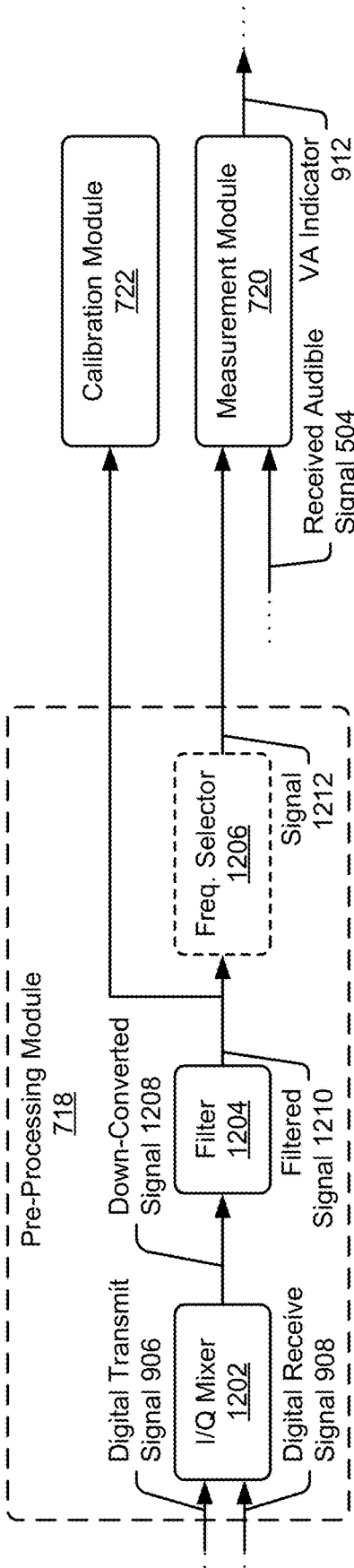
FIG. 12 illustrates an example implementation of a pre-processing module for performing aspects of voice activity detection using active acoustic sensing.

FIG. 12 illustrates an example implementation of the pre-processing module 718 for performing aspects of voice activity detection 112 using active acoustic sensing. In the depicted configuration, the hearable 102 includes the pre-processing module 718, which is coupled to the measurement module 720 and the calibration module 722. The measurement module 720 is also coupled to the microphone 710 (not shown).

The pre-processing module 718 includes at least one in-phase and quadrature mixer 1202 (I/Q mixer 1202) and at least one filter 1204. The in-phase and quadrature mixer 1202 performs frequency down-conversion. In an example implementation, the in-phase and quadrature mixer 1202 includes at least two mixers, at least one phase shifter, and at least one combiner (e.g., a summation circuit). The filter 1204 attenuates intermodulation products that are generated by the in-phase and quadrature mixer 1202. In an example implementation, the filter 1204 is implemented using a low-pass filter.

The pre-processing module 718 can optionally include at least one frequency selector 1206. The frequency selector 1206 can identify and select one or more tones 904 (or carrier frequencies) that provide a high-quality signal for later processing. The frequency selector 1206 can further pass the selected tones 904 to other processing modules and filter (or attenuate) other tones that are not selected. The frequency selector 1206 can be implemented in a similar manner as the calibration module 722 of FIG. 11. For example, the frequency selector 1206, can include the amplitude detector 1102, the phase detector 1104, the quality detector 1106, and the comparator 1108.

During an operation, the in-phase and quadrature mixer 1202 uses the phase shifter and the two mixers to generate in-phase and quadrature components associated with the digital receive signal 908. In particular, the in-phase and quadrature mixer 1202 mixes the digital receive signal 908 with a first version of the digital transmit signal 906 that has a zero-degree phase shift to generate the in-phase component. Additionally, the in-phase and quadrature mixer 1202 mixes the digital receive signal 908 with a second version of the digital transmit signal 906 that has a 180-degree phase shift to generate the quadrature signal. This mixing operation downconverts the digital receive signal 908 from acoustic frequencies to baseband frequencies. Using the combiner, the in-phase and quadrature mixer 1202 combines the in-phase and quadrature components of the digital receive signal 908 to generate a down-converted signal 1208. Use of the in-phase and quadrature mixer 1202 can further improve the signal-to-noise ratio of the down-converted signal 1208 compared to other mixing techniques.

In this example, the down-converted signal 1208 represents a combination of the in-phase and quadrature components of the mixed-down digital receive signal 908. In alternative implementations, the in-phase and quadrature mixer 1202 doesn't include the combiner and passes the in-phase and quadrature components separately to the filter 1204. In this manner, the in-phase and quadrature components individually propagate through the filter 1204.

The filter 1204 generates a filtered signal 1210 based on the down-converted signal 1208. In particular, the filter 1204 filters the down-converted signal 1208 to attenuate spurious or undesired frequencies (e.g., intermodulation products), some of which can be associated with an operation of the in-phase and quadrature mixer 1202. In this example, the filtered signal 1210 represents a combination of the in-phase and quadrature components of the down-converted signal 1208. Alternatively, the filtered signal 1210 can represent separate or distinct in-phase and quadrature components, which are individually passed to the frequency selector 1206, the calibration module 722, or the measurement module 720.

During the measurement procedure, the pre-processing module 718 can optionally apply the frequency selector 1206. The frequency selector 1206 passes tones that meet a quality threshold level of performance for audioplethysmography 110. For example, the frequency selector 1206 passes tones 904 having an amplitude 1110 and/or phase 1112 with a quality metric 1114 that is greater than or equal to a threshold 1116. The resulting signal outputted by the frequency selector 1206 is represented by signal 1212. In some implementations, this signal 1212 is passed to the measurement module 720 as the pre-processed signal 910. In other implementations in which the frequency selector 1206 is not implemented, the filtered signal 1210 can be passed to the measurement module 720 and/or the calibration module 722 as the pre-processed signal 910.

In general, the measurement module 720 can generate the voice activity indicator 912 based on the pre-processed signal 910. In example implementations, the measurement module 720 can be implemented using a machine-learned model or another model that performs signal and/or data processing. In this case, the measurement module 720 can analyze the changes in the amplitude 1110 and/or phase 1112 of the pre-processed signal 910 to determine whether or not the voice component 404 is present. This processing technique can be utilized in implementations of the hearable 102 that have minimal (if any) interference between the over-the-air signal 402 and the ultrasound signal 410 or in situations in which voice activity detection 112 is performed in a relatively quiet environment.

To handle noisy environments, however, the measurement module 720 can generate the voice activity indicator 912 based on the pre-processed signal 910 and the received audible signal 504. More specifically, the measurement module 720 can utilize the received audible signal 504 as a reference to filter (e.g., attenuate) the modulation component 510 within the pre-processed signal 910 and detect the voice component 404. An example implementation of the measurement module 720, which can perform voice activity detection 112 in noisy environments, is further described with respect to FIG. 13.

Figure 13:
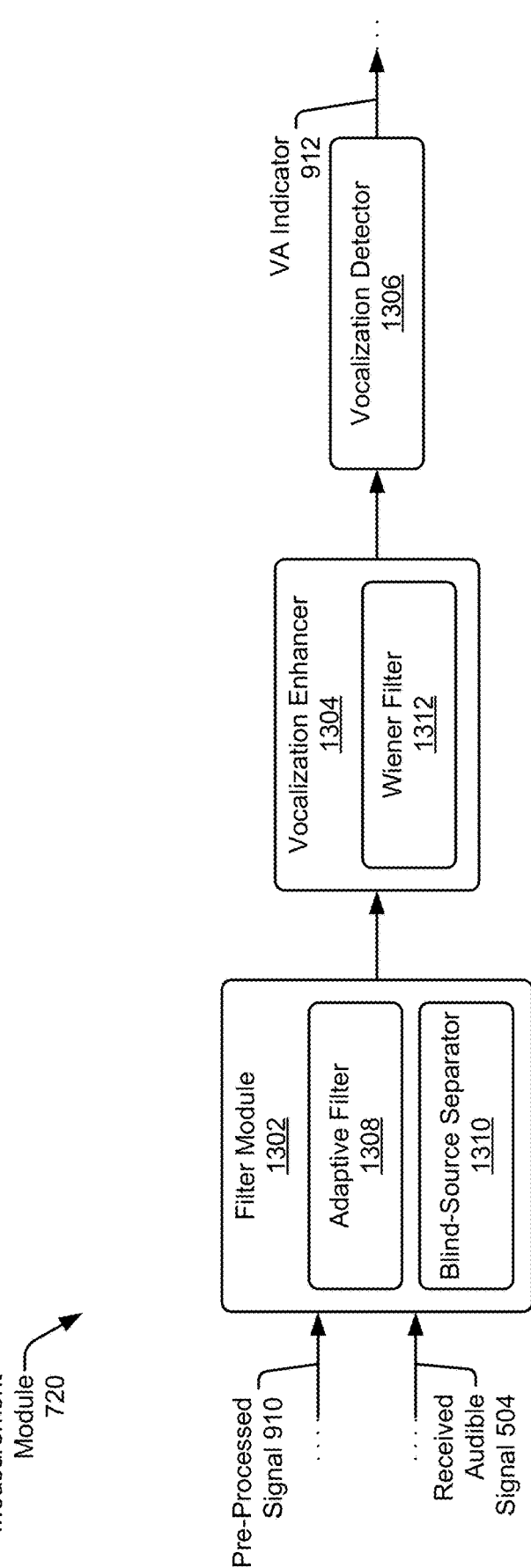
FIG. 13 illustrates an example implementation of a measurement module for performing voice activity detection using active acoustic sensing.

FIG. 13 illustrates an example implementation of the measurement module 720 for performing voice activity detection 112 using active acoustic sensing. In the depicted configuration, the measurement module 720 includes at least one filter module 1302, at least one vocalization enhancer 1304, and at least one vocalization detector 1306. The filter module 1302 can be implemented using at least one adaptive filter 1308 or at least one blind-source separator 1310. The adaptive filter 1308 performs adaptive filtering using the received audible signal 504 as a reference to filter the modulation component 510 from the pre-processed signal 910. The blind-source separator 1310 performs blind-source separation (BSS) using the received audible signal 504 as a reference to filter the modulation component 510 from the pre-processed signal 910. Explained another way, adaptive filtering and/or blind-source separation utilize the received audible signal 504 to separate the voice component 404 from the modulation component 510 (or from the modulated noise component 406) within the pre-processed signal 910. In general, the adaptive filter 1308 and the blind-source separator 1310 can utilize the received audible signal 504 to significantly attenuate the modulation component 510 (or the modulated noise component 406) within the pre-processed signal 910. To perform adaptive filtering or blind-source separation, the pre-processed signal 910 represents a primary reference (e.g., the primary channel or the signal to be filtered) and the received audible signal 504 represents a secondary or a noise reference (e.g., the reference channel).

The vocalization enhancer 1304 enhances (e.g., amplifies relative to a noise level) the voice component 404 within an output signal provided by the filter module 1302. In this way, the vocalization enhancer 1304 can increase sensitivity for performing voice activity detection 112. In an example implementation, the vocalization enhancer 1304 is implemented using a wiener filter 1312.

The vocalization detector 1306 can detect the voice component 404 within an output signal provided by the vocalization enhancer 1304. The vocalization detector 1306 generates the voice activity indicator 912 to indicate whether or not the voice component 404 is detected. In some examples, the vocalization detector 1306 can perform a signal-to-noise ratio detection process, which determines whether or not an amplitude of an input signal exceeds a detection threshold. If the amplitude exceeds the detection threshold, the vocalization detector 1306 generates the voice activity indicator 912 to indicate that the vocalization 212 is detected. Otherwise, if the amplitude does not exceed the detection threshold, the vocalization detector 1306 generates the voice activity indicator 912 to indicate that a vocalization 212 is not detected. Voice activity detection 112 can be utilized in a variety of different ways to control an operation of the hearable 102 and/or the computing device 104, as further described with respect to FIG. 14.

Figure 14:
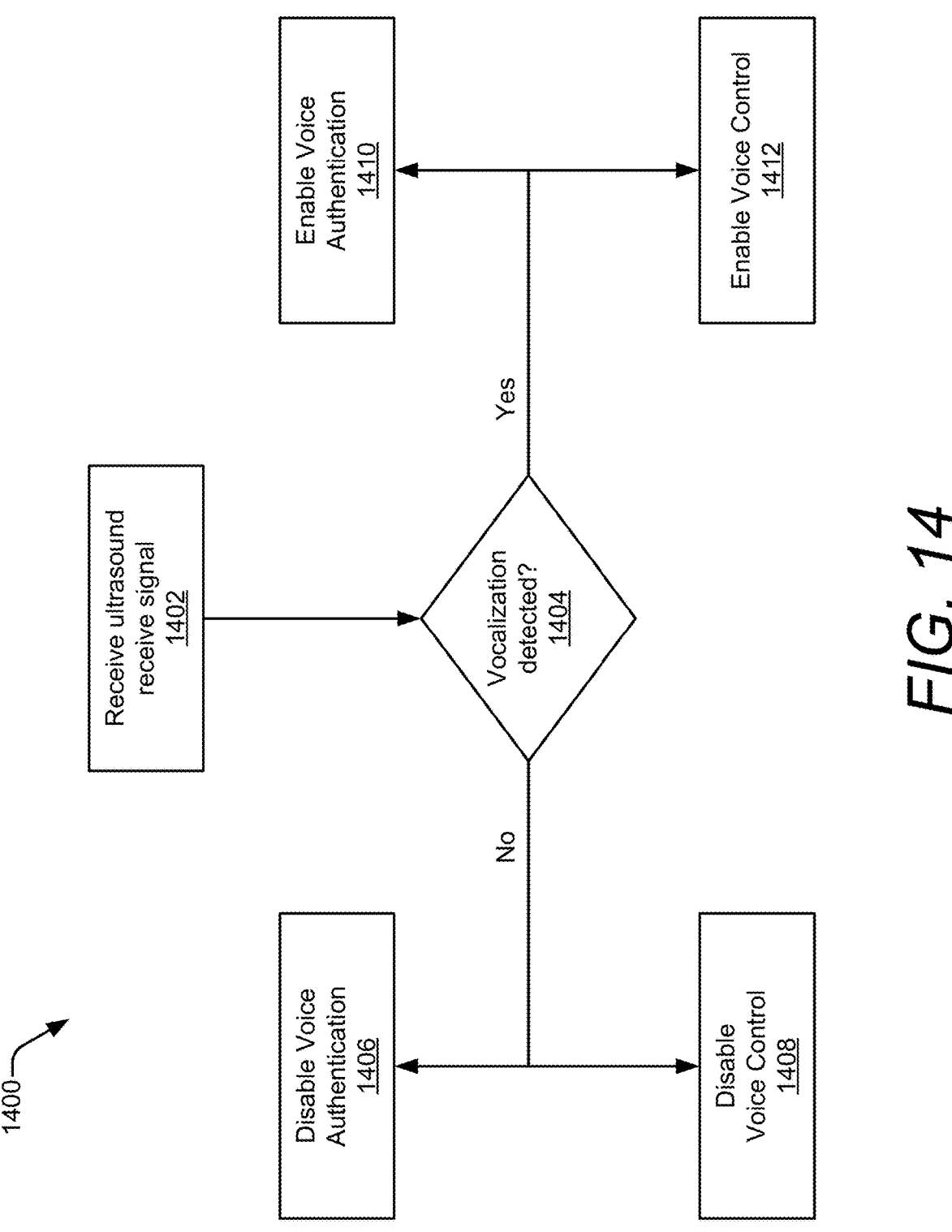
FIG. 14 illustrates an example scheme for applying voice activity detection.

FIG. 14 illustrates an example scheme 1400 for applying voice activity detection 112. In this example, voice activity detection 112 can be used to enhance performance of a voice control interface 202 or enhance security for voice authentication. At 1402, the hearable 102 receives the ultrasound receive signal 804. At 1404, the hearable 102 detects or does not detect a vocalization 212 made by the user 106 based on the ultrasound receive signal 804. In particular, the hearable 102 uses the measurement module 720 to analyze the pre-processed signal 910 and generate the voice activity indicator 912, which indicates whether or not the vocalization 212 is detected.

If the hearable 102 does not detect a vocalization (e.g., determines that a vocalization did not occur or determines the absence of a vocalization), the hearable 102 disables voice authentication at 1406 and/or disables voice control at 1408. More specifically, the hearable 102 can generate a voice activity indicator 912 that indicates vocalization is not detected and communicate this information to the voice authenticator 608. The voice activity indicator 912 can also include a time period associated with the ultrasound receive signal 804. This information causes the voice authenticator 608 to disable voice authentication or cause voice authentication to fail for at least the time period associated with the ultrasound receive signal 804. In this manner, even if the voice authenticator 608 recognizes the voiceprint phrase 302 during the same time period that is associated with the ultrasound receive signal 804, voice authentication fails. Additionally or alternatively, the voice activity indicator 912 causes the voice user interface 202 to disable voice control 1408 or otherwise ignore a recognized command that is received during the same time period associated with the ultrasound receive signal 804.

If the hearable 102 detects a vocalization at 1404, the hearable 102 can enable voice authentication at 1410 and/or enable voice control at 1412. More specifically, the hearable 102 can generate a voice activity indicator 912 that indicates a vocalization 212 is detected and communicate this information to the voice authenticator 608. With this information, the voice authenticator 608 can enable voice authentication. As such, voice authentication can succeed if other aspects of the multi-factor voice authentication are met. For example, voice authentication can succeed if the computing device 104 also recognizes the voiceprint phrase 302 during the same time period that is associated with the ultrasound receive signal 804.

Additionally or alternatively, the voice user interface 202 can enable voice control based on the voice activity indicator 912 indicating that the vocalization 212 is detected. As such, the user 106 can utilize the voice user interface 202 to control the computing device 104 and/or the hearable 102 provided that the voice command is recognized by the voice user interface 202. In some cases, the voice activity indicator 912 provides a timing reference, which can make it easier for the voice user interface 202 to detect a voice command. With voice activity detection 112 using active acoustic sensing, the hearable 102 can enhance voice control and/or enhance security of the computing device 104 against voice attacks. Example pre-processed signals 910 that capture the user 106's vocalizations are further described with respect to FIG. 15.

FIG. 15 illustrates the impact of a vocalization 212 on an ultrasound receive signal 804. More specifically, FIG. 15 depicts example amplitudes 1110 and phases 1112 of pre-processed signals 910 generated by different hearables 102-1 and 102-2. As shown below, the pressure wave caused by a vocalization 212 can significantly impact the amplitude 1110 and/or the phase 1112 of the pre-processed signals 910. In some instances, the change in the amplitude 1110 and/or the phase 1112 can be relative to a previous state or relative to a previous trend in the amplitude 1110 and/or the phase 1112. The previous state can refer to values of the amplitude 1110 and/or the phase 1112 during which the user 106 does not vocalize.

In general, the term "significantly" can mean that the values of the amplitude 1110 and/or the phase 1112 can change by 20% or more relative to a previous value (e.g., relative to an average of a set of previous values). Additionally or alternatively, a slope of the amplitude 1110 and/or the phase 1112 can vary significantly. Sometimes the slope of the amplitude 1110 and/or the phase 1112 can change signs (e.g., from a positive slope to a negative slope, or vice versa). A magnitude of the slope of the amplitude 1110 and/or the phase 1112 can sometimes change by approximately 10% or more.

In some implementations, the measurement module 720 can detect and recognize the vocalization 212 based on the amplitude 1110 of the pre-processed signal 910 provided by the hearable 102-1, the phase 1112 of the pre-processed signal 910 provided by the hearable 102-1, the amplitude 1110 of the pre-processed signal 910 provided by the hearable 102-2, the phase 1112 of the pre-processed signal 910 provided by the hearable 102-2, or some combination thereof. Generally speaking, processing a larger quantity of signals and/or tones 904 that are sensitive to the pressure wave caused by the vocalization 212 provides more information to the measurement module 720. This can make it easier for the measurement module 720 to accurately detect the vocalization 212.

Graphs 1500-1 and 1500-2 depict amplitudes 1110 and phases 1112 of pre-processed signals 910 that are respectively generated by the hearables 102-1 and 102-2. Time is depicted along the horizontal axes of the graphs 1500-1 and 1500-2.

During the time interval indicated at 1502, the user 106 makes a vocalization 212 (e.g., speaks, hums, whistles, sings, or makes other utterances). This causes the amplitude 1110 and/or the phase 1112 of the ultrasound receive signal 804 to change significantly relative to a previous state. With audioplethysmography 110, the measurement module 720 can detect and recognize the vocalization 212 based on the change in the amplitude 1110 and/or phase 1112 of the pre-processed signals 910 provided by the hearable 102-1 and/or the hearable 102-2.

If the microphone 710 that detects the ultrasound receive signal 804 is also used to receive the over-the-air signal 402, the measurement module 720 can perform additional processing to separate the vocalization 212 from the modulation component 510. In particular, the measurement module 720 can utilize the received audible signal 504 as a reference signal to perform adaptive filtering and/or blind-source separation to detect the vocalization 212 for voice activity detection 112.

Aspects of voice activity detection 112 can be performed using one hearable 102 (e.g., the hearable 102-1 or 102-2) or multiple hearables 102 (e.g., the hearables 102-1 and 102-2). With multiple hearables 102 performing voice activity detection 112, the computing device 104 can have higher confidence that the user 106's vocalization is detected. In general, the hearable 102 can detect a vocalization by analyzing changes in the amplitude 1110 of the ultrasound receive signal 804, changes in the phase 1112 of the ultrasound receive signal 804, or changes in both the amplitude 1110 and phase 1112 of the ultrasound receive signal 804.

Example Methods

FIGS. 16 and 17 depict example methods 1600 and 1700 for implementing aspects of voice activity detection 112 using active acoustic sensing. Methods 1600 and 1700 are shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environments 100, 200, 300-1, and 300-2 of FIGS. 1, 2, and 3, and entities detailed in FIGS. 6 and 7, reference to which is made for example only. The techniques are not limited to performance by one entity or multiple entities operating on one device.

At 1602, an ultrasound transmit signal is transmitted during a first time period. The ultrasound transmit signal propagates within at least a portion of an ear canal of a user. For example, the transducer 706 (or speaker 708) of the hearable 102 transmits the ultrasound transmit signal 802. The ultrasound transmit signal 802 propagates within at least a portion of the ear canal 114 of the user 106, as described with respect to FIGS. 4 and 8.

At 1604, an ultrasound receive signal is received. The ultrasound receive signal represents a version of the ultrasound transmit signal with one or more waveform characteristics modified based on the propagation within the ear canal and based on a vocalization made by the user during the first time period. For example, the transducer 706 (or the microphone 710) of the hearable 102 receives the ultrasound receive signal 804. The ultrasound receive signal 804 represents a version of the ultrasound transmit signal 802 with one or more waveform characteristics modified based on the propagation within the ear canal 114 and based on a vocalization 212 made by the user 106 during the first time period. The hearable 102 that receives the ultrasound receive signal 804 can be a same hearable 102 that transmitted the ultrasound transmit signal 802 (e.g., the hearable 102-1 or 102-2 in FIG. 8), or another hearable 102 that did not transmit the ultrasound transmit signal 802 (e.g., the hearable 102-2 in FIG. 8). Example waveform characteristics include amplitude, phase, and/or frequency. In some implementations, a feedback microphone of an active-noise-cancellation circuit 724 can receive the ultrasound receive signal 804.

At 1606, the vocalization is detected based on the one or more modified characteristics of the ultrasound receive signal. For example, the hearable 102 uses the measurement module 720 to analyze the one or more modified characteristics of the ultrasound receive signal 804 and detect the vocalization 212. The hearable 102 can generate a voice activity indicator 912, which can be used to control an operation of the hearable 102 and/or an operation of the computing device 104. The voice activity indicator 912 indicates whether or not the hearable 102 detected the vocalization 212.

In one aspect, the voice activity indicator 912 can enable or disable the voice control interface 202. This can reduce a probability of the voice control interface 202 incorrectly processing a voice command provided by another person and enhance performance of the voice control interface 202. In another aspect, the voice activity indicator 912 can enable or disable voice authentication. With voice activity detection 112, the hearable 102 can provide multi-factor voice authentication that enhances security and provides robust protection from voice attacks.

At 1702 in FIG. 17, active acoustic sensing is performed to detect a pressure wave that propagates within an ear canal of a user and is associated with a vocalization of the user. For example, the hearable 102 performs active acoustic sensing to detect a pressure wave that propagates within an ear canal 114 of a user 106 and is associated with a vocalization 212 of the user 106. To perform active acoustic sensing, the hearable 102 transmits and receives an ultrasound signal 410 (e.g., the ultrasound transmit signal 802 and the ultrasound receive signal 804). The received ultrasound signal 410 includes the voice component 404, which enables audioplethysmography 110 to perform voice activity detection 112.

At 1704, voice activity detection is performed based on the active acoustic sensing. For example, the hearable 102 performs voice activity detection 112 based on the active acoustic sensing. More specifically, the hearable 102 analyzes the amplitude 1110 and/or phase 1112 of the ultrasound receive signal 804 to detect the vocalization 212. In some implementations, the hearable 102 can utilize a received audible signal 504 to process the ultrasound receive signal 804 and attenuate a modulation component 510 to enhance voice activity detection 112.

At 1706, a signal that controls an operation of at least one of a hearable or a computing device that is coupled to the hearable is generated. For example, the measurement module 720 generates a voice activity indicator 912, which can be used to control an operation of the hearable 102 and/or the computing device 104.

Example Computing System

Figure 18:
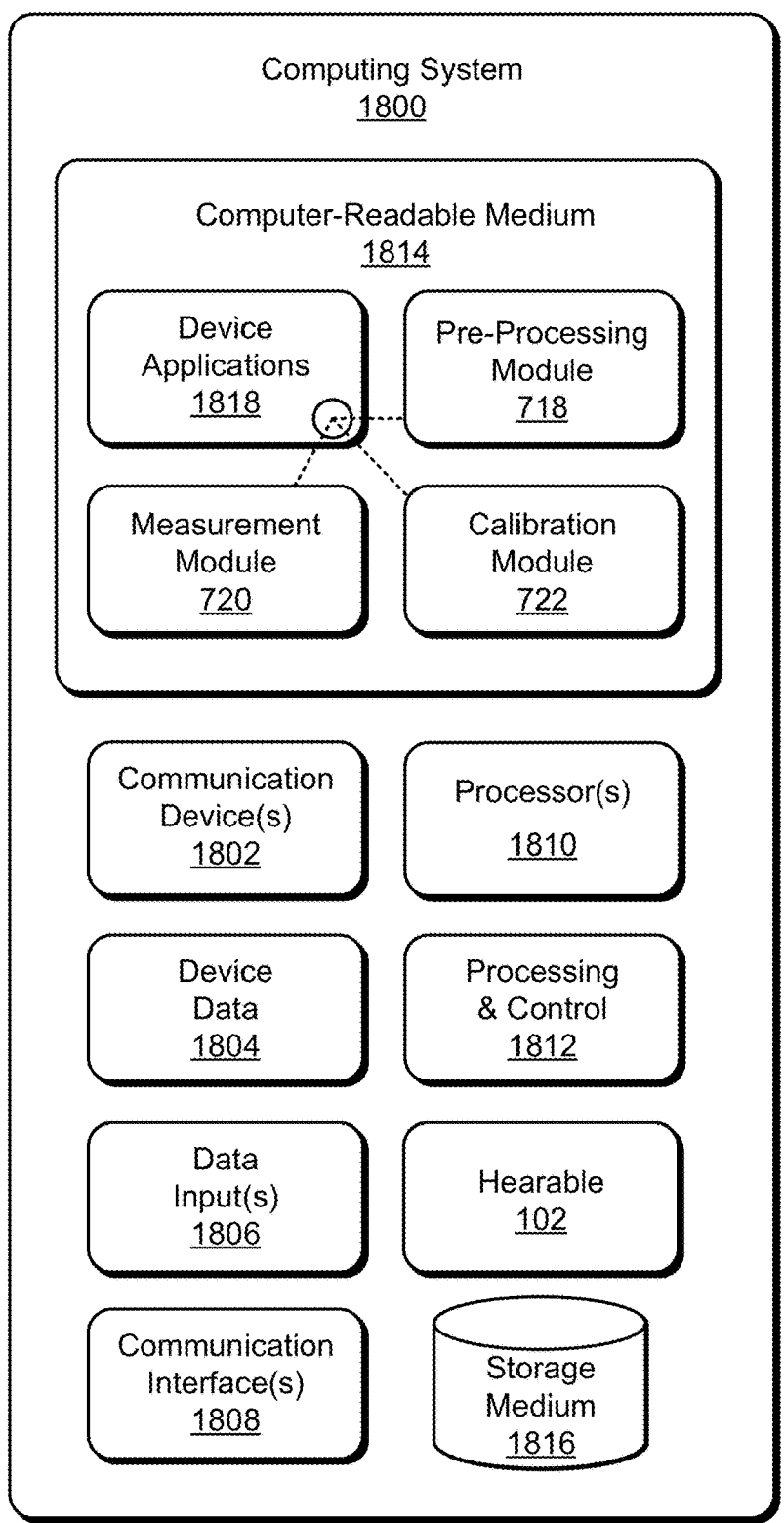
FIG. 18 illustrates an example computing system embodying, or in which techniques may be implemented that enable use of, voice activity detection using active acoustic sensing.

FIG. 18 illustrates various components of an example computing system 1800 that can be implemented as any type of client, server, and/or computing device as described with reference to the previous FIGS. 6 and 7 to implement aspects of active acoustic sensing using a hearable.

The computing system 1800 includes communication devices 1802 that enable wired and/or wireless communication of device data 1804 (e.g., received data, data that is being received, data scheduled for broadcast, or data packets of the data). The communication devices 1802 or the computing system 1800 can include one or more hearables 102. The device data 1804 or other device content can include configuration settings of the device, media content stored on the device, and/or information associated with a user of the device. Media content stored on the computing system 1800 can include any type of audio, video, and/or image data. The computing system 1800 includes one or more data inputs 1806 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 1800 also includes communication interfaces 1808, which can be implemented as any one or more of a serial and/or parallel interface, a wireless interface, any type of network interface, a modem, and as any other type of communication interface. The communication interfaces 1808 provide a connection and/or communication links between the computing system 1800 and a communication network by which other electronic, computing, and communication devices communicate data with the computing system 1800.

The computing system 1800 includes one or more processors 1810 (e.g., any of microprocessors, controllers, and the like), which process various computer-executable instructions to control the operation of the computing system 1800. Alternatively or in addition, the computing system 1800 can be implemented with any one or combination of hardware, firmware, or fixed logic circuitry that is implemented in connection with processing and control circuits which are generally identified at 1812. Although not shown, the computing system 1800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1800 also includes a computer-readable medium 1814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1800 can also include a mass storage medium device (storage medium) 1816.

The computer-readable medium 1814 provides data storage mechanisms to store the device data 1804, as well as various device applications 1818 and any other types of information and/or data related to operational aspects of the computing system 1800. For example, an operating system 1820 can be maintained as a computer application with the computer-readable medium 1814 and executed on the processors 1810. The device applications 1818 may include a device manager, such as any form of a control application, software application, signal-processing and control module, code that is native to a particular device, a hardware abstraction layer for a particular device, and so on.

The device applications 1818 also include any system components, engines, or managers to implement audioplethysmography 110 for voice activity detection 112. In this example, the device applications 1818 include the preprocessing module 718, the measurement module 720, and optionally the calibration module 722. Although not explicitly shown, the device applications 1818 can also include the application 606, the voice user interface 202, and/or the voice authenticator 608.

Throughout this disclosure, examples are described where a computing system 1800 (e.g., the hearable 102, the computing device 104, a client device, a server device, a computer, or another type of computing system) may analyze information (e.g., various audible and/or ultrasound signals) associated with a user, for example, the vocalization 212 mentioned with respect to FIG. 2. Further to the descriptions above, a user 106 may be provided with controls allowing the user 106 to make an election as to both if and when systems, programs, and/or features described herein may enable collection of information (e.g., information about a user's social network, social actions, social activities, profession, a user's preferences, a user's current location), and if the user is sent content or communications from a server. The computing system 1800 can be configured to only use the information after the computing system 1800 receives explicit permission from the user 106 to use the data. For example, in situations where the hearable 102 analyzes signals to authenticate the user 106, individual users 106 may be provided with an opportunity to provide input to control whether programs or features of the computing system 1800 can collect and make use of the data. Further, individual users 106 may have constant control over what programs can or cannot do with the information.

In addition, information collected may be pre-treated in one or more ways before it is transferred, stored, or otherwise used, so that personally-identifiable information is removed. For example, before the computing system 1800 shares data with another device, a user 106's identity may be treated so that no personally identifiable information can be determined for the user 106. Thus, the user 106 may have control over whether information is collected about the user 106 and the user 106's device, and how such information, if collected, may be used by the computing system 1800 and/or a remote computing system.

CONCLUSION

Although techniques using, and apparatuses including, performing voice activity detection using active acoustic sensing have been described in language specific to features and/or methods, it is to be understood that the subject of the appended examples is not necessarily limited to the specific features or methods described. Rather, the specific features and methods are disclosed as example implementations of performing voice activity detection using active acoustic sensing.

Some examples are provided below.

Example 1: A method comprising:
transmitting, during a first time period, an ultrasound transmit signal that propagates within at least a portion of an ear canal of a user;
receiving, during the first time period, an ultrasound receive signal, the ultrasound receive signal representing a version of the ultrasound transmit signal with one or more characteristics modified based on the propagation within the ear canal and based on a vocalization made by the user during the first time period; and
detecting the vocalization based on the one or more modified characteristics of the ultrasound receive signal.

Example 2: The method of example 1, wherein the detecting the vocalization comprises detecting a change in an amplitude and/or a phase of the ultrasound receive signal.

Example 3: The method of example 1, further comprising:
generating, during the first time period, a received audible signal comprising audible frequencies, the audible frequencies comprising the vocalization made by the user during the first time period, wherein:
the receiving of the ultrasound receive signal comprises generating a received ultrasound signal, the received ultrasound signal having a modulation component associated with the received audible signal; and
the detecting the vocalization comprises attenuating the modulation component within the received ultrasound signal based on the received audible signal.

Example 4: The method of example 3, wherein the modulation component represents a version of the received audible signal that is linearly modulated onto the received ultrasound signal.

Example 5: The method of example 3 or 4, wherein the attenuating of the modulation component comprises performing adaptive filtering with the received ultrasound signal representing a primary reference and the received audible signal representing a secondary reference.

Example 6: The method of any one of examples 3 to 5, wherein the generating of the received audible signal and the generating of the received ultrasound signal comprises generating the received audible signal and the received ultrasound signal using a same microphone.

Example 7: The method of any previous example, wherein the vocalization comprises speech, humming, whistling, or singing.

Example 8: The method of any previous example, further comprising:
communicating to a computing device that the vocalization is detected to enable a voice control interface and/or to enable voice authentication.

Example 9: The method of any previous example, further comprising:
transmitting, during a second time period, another ultrasound transmit signal that propagates within at least a portion of the ear canal of the user;
receiving, during the second time period, another ultrasound receive signal, the other ultrasound receive signal representing a version of the other ultrasound transmit signal; and
determining that the user did not make another vocalization during the second time period based on the other ultrasound receive signal.

Example 10: The method of example 9, further comprising:
communicating to a computing device that the other vocalization is not detected to disable a voice control interface and/or to disable voice authentication.

Example 11: The method of any previous example, wherein the transmitting of the ultrasound transmit signal comprising transmitting the ultrasound transmit signal with at least two tones.

Example 12: The method of example 11, further comprising:
transmitting, prior to the transmitting of the ultrasound transmit signal, another ultrasound transmit signal that propagates within at least the portion of the ear canal of the user, the other ultrasound transmit signal having multiple tones, the multiple tones including the at least two tones and at least one other tone;
receiving, prior to the transmitting of the ultrasound transmit signal, another ultrasound receive signal, the other ultrasound receive signal representing a version of the other ultrasound transmit signal with one or more characteristics modified due to the propagation within the ear canal; and
selecting the at least two tones from the multiple tones based on the other ultrasound receive signal.

Example 13: The method of example 12, wherein transmitting the ultrasound transmit signal comprises at least one of the following:
transmitting the ultrasound transmit signal such that the ultrasound transmit signal has a higher amplitude at the at least two tones compared to an amplitude of the other ultrasound transmit signal at the multiple tones; or
transmitting the ultrasound signal such that a duration of ultrasound transmit signal at each of the at least two tones is longer compared to a duration of the other ultrasound transmit signal at each of the multiple tones.

Example 14: A computer-readable storage medium comprising instructions that, responsive to execution by a processor, cause a hearable to perform any one of the methods of examples 1 to 13.

Example 15: A device comprising:

at least one transducer; and at least one processor, the device configured to perform, using the at least one transducer and the at least one processor, any one of the methods of examples 1 to 13.

Example 16: The device of example 17, further comprising:

a speaker; and an active-noise-cancellation circuit comprising a feedback microphone, wherein the at least one transducer comprises the speaker and the feedback microphone.

Example 17: The device of example 17, wherein:

the at least one transducer comprises a speaker and a microphone;

the speaker is configured to be positioned proximate to a first ear of a user; and the microphone is configured to be positioned proximate to a second ear of the user.

Example 18: The device of any one of examples 17 to 19, wherein the device comprises:

at least one earbud; or headphones.

Example 19: A method comprising:

transmitting, during a first time period, an ultrasound transmit signal that propagates within at least a portion of the ear canal of the user;

receiving, during the first time period, an ultrasound receive signal, the ultrasound receive signal representing a version of the ultrasound transmit signal with one or more characteristics modified based on the propagation within the ear canal and based on a vocalization made by the user during the first time period;

detecting the vocalization based on the ultrasound receive signal; and generating a control signal that controls an operation of a device based on the detected vocalization.

Example 20: The method of example 19, wherein:

the device comprises a hearable;

the transmitting of the ultrasound transmit signal comprises transmitting the ultrasound transmit signal using the hearable; and the receiving of the ultrasound receive signal comprises receiving the ultrasound receive signal using the hearable.

Example 21: The method of example 19, wherein:

the device comprises a computing device that is coupled to a hearable;

the transmitting of the ultrasound transmit signal comprises transmitting the ultrasound transmit signal using the hearable;

the receiving of the ultrasound receive signal comprises receiving the ultrasound receive signal using the hearable.

Example 22: The method of example 20 or 21, further comprising:

enabling voice control and/or voice authentication based on the control signal.

Example 23: The method of any one of examples 19 to 22, wherein the detecting the vocalization comprises detecting a change in an amplitude and/or a phase of the ultrasound receive signal.

Example 24: The method of any one of examples 19 to 23, further comprising:

transmitting, during a second time period, another ultrasound transmit signal that propagates within at least a portion of the ear canal of the user;

receiving, during the second time period, another ultrasound receive signal, the other ultrasound receive signal representing a version of the other ultrasound transmit signal;

determining an absence of another vocalization during the second time period based on the other ultrasound receive signal; and generating another control signal that controls the operation of the device based on the determined absence of the other vocalization.

Example 25: The method of example 24, further comprising:

disabling a voice control interface and/or voice authentication based on the other control signal.

Example 26: The method of any one of examples 19 to 25, further comprising:

receiving, during the first time period, an over-the-air signal comprising the vocalization made by the user during the first time period and a noise component, wherein:

the received ultrasound receive signal has a modulation component associated with the noise component of the received over-the-air signal; and the detecting of the vocalization comprises attenuating the modulation component within the received ultrasound receive signal based on the received audible signal.

Example 27: The method of any one of examples 19 to 26, wherein the vocalization comprises speech, humming, whistling, or singing.

Example 28: The method of any one of examples 19 to 27, further comprising:

transmitting, prior to the transmitting of the ultrasound transmit signal, another ultrasound transmit signal that propagates within at least the portion of the ear canal of the user, the other ultrasound transmit signal having multiple tones;

receiving, prior to the transmitting of the ultrasound transmit signal, another ultrasound receive signal, the other ultrasound receive signal representing a version of the other ultrasound transmit signal with one or more characteristics modified due to the propagation within the ear canal;

generating quality metrics that respectively correspond to the multiple tones, the quality metrics based on amplitudes and/or phases of the multiple tones; and selecting at least two tones from the multiple tones based on the quality metrics corresponding to the at least two tones being greater than a threshold, wherein the transmitting of the ultrasound transmit signal comprises transmitting the ultrasound transmit signal having the at least two tones.

Example 29: The method of example 28, wherein the transmitting of the ultrasound transmit signal comprises at least one of the following:

transmitting the ultrasound transmit signal such that the ultrasound transmit signal has a higher amplitude at the at least two tones compared to an amplitude of the other ultrasound transmit signal at the multiple tones; or transmitting the ultrasound signal such that a duration of ultrasound transmit signal at each of the at least two tones is longer compared to a duration of the other ultrasound transmit signal at each of the multiple tones.

Example 30: A computer-readable storage medium comprising instructions that, responsive to execution by a processor, cause a hearable to perform any one of the methods of example 19 to 29.

Example 31: A device comprising:

at least one transducer; and at least one processor, the device configured to perform, using the at least one transducer and the at least one processor, any one of the methods of examples 19 to 29.

Example 32: The device of example 31, further comprising:

a speaker; and an active-noise-cancellation circuit comprising a feedback microphone, wherein the at least one transducer comprises the speaker and the feedback microphone.

Example 33: The device of example 31, wherein:

the at least one transducer comprises a speaker and a microphone;

the speaker is configured to be positioned proximate to a first ear of a user; and the microphone is configured to be positioned proximate to a second ear of the user.

Example 34: The device of any one of examples 31 to 33, wherein the device comprises:

at least one earbud; or headphones.

What is claimed is:

1. A method comprising:

receiving, during a first time period, an over-the-air signal comprising a vocalization made by a user during the first time period and a noise component;

transmitting, during the first time period, an ultrasound transmit signal that propagates within at least a portion of an ear canal of the user;

receiving, during the first time period, an ultrasound receive signal, the ultrasound receive signal representing a version of the ultrasound transmit signal with one or more characteristics modified based on a propagation within the ear canal and based on the vocalization made by the user during the first time period, the ultrasound receive signal comprising a modulation component associated with the noise component of the received over-the-air signal;

generating a filtered ultrasound receive signal by attenuating the modulation component within the ultrasound receive signal based on the received over-the-air signal; and detecting the vocalization based on the one or more modified characteristics of the filtered ultrasound receive signal.

2. The method of claim 1, wherein the detecting the vocalization comprises detecting a change in at least one of an amplitude or a phase of the filtered ultrasound receive signal.

3. The method of claim 1, further comprising:

generating a control signal that controls an operation of a device based on the detected vocalization; and enabling voice control or voice authentication based on the control signal.

4. The method of claim 3, wherein the modulation component represents a version of the received over-the-air signal that is linearly modulated onto the received ultrasound received signal.

5. The method of claim 3, wherein the attenuating of the modulation component comprises performing adaptive filtering with the received ultrasound received signal representing a primary reference and the received over-the-air signal representing a secondary reference.

6. The method of claim 3, wherein the generating of the received over-the-air signal and the generating of the received filtered ultrasound received signal comprises generating the received over-the-air signal and the received ultrasound received signal using a same microphone.

7. The method of claim 1, wherein the vocalization comprises speech, humming, whistling, or singing.

8. The method of claim 3, wherein the device comprises a hearable or a computing device that is coupled to the hearable.

9. The method of claim 1, further comprising:

transmitting, during a second time period, another ultrasound transmit signal, the another ultrasound transmit signal to propagate within at least a portion of the ear canal of the user;

receiving, during the second time period, another ultrasound receive signal, the another ultrasound receive signal representing a version of the another ultrasound transmit signal; and determining an absence of another vocalization during the second time period based on the another ultrasound receive signal.

10. The method of claim 9, further comprising:

generating another control signal that controls an operation of a device based on the determined absence of the another vocalization; and disabling a voice control interface or voice authentication based on the another control signal.

11. The method of claim 1, wherein the transmitting of the ultrasound transmit signal comprising transmitting the ultrasound transmit signal with at least two tones.

12. The method of claim 11, further comprising:

transmitting, prior to the transmitting of the ultrasound transmit signal, another ultrasound transmit signal that propagates within the at least the portion of the ear canal of the user, the another ultrasound transmit signal having multiple tones, the multiple tones including the at least two tones and at least one other tone;

receiving, prior to the transmitting of the ultrasound transmit signal, another ultrasound receive signal, the another ultrasound receive signal representing a version of the another ultrasound transmit signal with one or more characteristics modified due to a propagation within the ear canal; and selecting the at least two tones from the multiple tones based on the another ultrasound receive signal.

13. The method of claim 12, wherein transmitting the ultrasound transmit signal comprises at least one of the following:

transmitting the ultrasound transmit signal such that the ultrasound transmit signal has a higher amplitude at the at least two tones compared to an amplitude of the another ultrasound transmit signal at the multiple tones; or transmitting the ultrasound transmit signal such that a duration of the ultrasound transmit signal at each of the at least two tones is longer compared to a duration of the another ultrasound transmit signal at each of the multiple tones.

14. A computer-readable storage medium comprising instructions that, responsive to execution by a processor, cause a hearable to:

receive, during a first time period, an over-the-air signal comprising a vocalization made by a user during the first time period and a noise component;

transmit, during the first time period, an ultrasound transmit signal that propagates within at least a portion of an ear canal of the user;

receive, during the first time period, an ultrasound receive signal, the ultrasound receive signal representing a version of the ultrasound transmit signal with one or more characteristics modified based on a propagation within the ear canal and based on the vocalization made by the user during the first time period, the ultrasound receive signal comprising a modulation component associated with the noise component of the received over-the-air signal;

generate a filtered ultrasound receive signal by attenuating the modulation component within the ultrasound receive signal based on the received over-the-air signal; and detect the vocalization based on the one or more modified characteristics of the filtered ultrasound receive signal.

15. The computer-readable storage medium of claim 14, wherein the instructions cause the hearable to:

communicate to a computing device that the vocalization is detected to enable a voice control interface or to enable voice authentication.

16. The computer-readable storage medium of claim 14, wherein the instructions cause the hearable to:

communicate to a computing device that the vocalization is detected to enable voice authentication.

17. A device comprising:

at least one transducer configured to:

receiving, during a first time period, an over-the-air signal comprising a vocalization made by a user during the first time period and a noise component;

transmit, during the first time period, an ultrasound transmit signal that propagates within at least a portion of an ear canal of the user; and receive, during the first time period, an ultrasound receive signal, the ultrasound receive signal representing a version of the ultrasound transmit signal with one or more characteristics modified based on a propagation within the ear canal and based on a vocalization made by the user during the first time period, the ultrasound receive signal comprising a modulation component associated with the noise component of the received over-the-air signal; and at least one processor coupled to the at least one transducer and configured to:

generate a filtered ultrasound receive signal by attenuating the modulation component within the ultrasound receive signal based on the received over-the-air signal; and detect the vocalization based on the one or more modified characteristics of the filtered ultrasound receive signal.

18. The device of claim 17, further comprising:

a speaker; and an active-noise-cancellation circuit comprising a feedback microphone, wherein the at least one transducer comprises the speaker and the feedback microphone.

19. The device of claim 17, wherein:

the at least one transducer comprises a speaker and a microphone;

the speaker is configured to be positioned proximate to a first ear of a user; and the microphone is configured to be positioned proximate to a second ear of the user.

20. The device of claim 17, wherein the device comprises:

at least one earbud; or headphones.

* * * * *